United States Patent
Shigehisa et al.

(10) Patent No.: US 8,994,982 B2
(45) Date of Patent: Mar. 31, 2015

(54) IMAGE FORMING DEVICE, IMAGE FORMING METHOD, AND IMAGE FORMING PROGRAM

(75) Inventors: Kei Shigehisa, Amagasaki (JP); Takeshi Morikawa, Takarazuka (JP); Nobuo Kamei, Osaka (JP); Takeshi Minami, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 909 days.

(21) Appl. No.: 12/349,565

(22) Filed: Jan. 7, 2009

(65) Prior Publication Data
US 2009/0174890 A1 Jul. 9, 2009

(30) Foreign Application Priority Data
Jan. 8, 2008 (JP) ................. 2008-001519

(51) Int. Cl.
G06K 15/00 (2006.01)
G06F 21/60 (2013.01)
G06F 12/14 (2006.01)

(52) U.S. Cl.
CPC ................. *G06F 21/608* (2013.01)
USPC .......... 358/1.15; 358/1.13; 358/1.14; 726/17; 726/21; 726/33; 726/28

(58) Field of Classification Search
CPC .... G06F 21/08; H04N 1/4406; H04N 1/4413; H04N 1/4433; H04N 1/444; H04N 1/0084; H04N 1/00843; H04N 1/00846; H04N 1/00848; H04N 1/00875
USPC ........ 358/1.11–1.18; 340/5.54; 713/182, 183; 235/492, 382; 382/305, 306; 399/45; 726/16–19
See application file for complete search history.

(56) References Cited

U.S. PATENT DOCUMENTS 6,480,297 B1 11/2002 Suzuki et al.
7,230,731 B2 * 6/2007 Dan et al. ............... 358/1.14
(Continued)

FOREIGN PATENT DOCUMENTS

JP 2000-134391 5/2000
JP 2003-145889 5/2003
(Continued)

OTHER PUBLICATIONS

Notification of Reason(s) for Refusal issued in the corresponding Japanese Patent Application No. 2008-001519 dated Dec. 8, 2009, and an English Translation thereof.
(Continued)

*Primary Examiner* — Chad Dickerson
(74) *Attorney, Agent, or Firm* — Buchanan Ingersoll & Rooney PC

(57) ABSTRACT

The image forming device includes an image data input unit that receives image data of a document; a set password acquisition unit that acquires information regarding a password from the image data received by the image data input unit; an input password receiving unit that starts reception of input of the password before the reception of the image data of all pages of the document is completed by the image data input unit; a password verification unit that performs verification between an input password and a set password; and a job execution unit that cancels execution limit of a job based on a verification result and executes the job, wherein, when the password is set in arbitrary one page of the document, the image data input unit sequentially completes the reception of the image data of the next page of the arbitrary one page of the document, before the input of the password corresponding to the password set in the arbitrary one page is completed by the input password receiving unit.

18 Claims, 20 Drawing Sheets

(56) References Cited

U.S. PATENT DOCUMENTS

| | | | |
|---|---|---|---|
| 7,298,505 B2 * | 11/2007 | Ueda | 358/1.14 |
| 7,567,355 B2 | 7/2009 | Matsunoshita | |
| 7,657,753 B2 | 2/2010 | Sawada | |
| 2003/0107756 A1 | 6/2003 | Dan et al. | |
| 2005/0149762 A1 * | 7/2005 | Smith et al. | 713/202 |
| 2005/0231746 A1 * | 10/2005 | Parry et al. | 358/1.13 |
| 2006/0007471 A1 * | 1/2006 | Okamoto et al. | 358/1.14 |
| 2007/0146779 A1 | 6/2007 | Yamada | |
| 2007/0243004 A1 * | 10/2007 | Kuwasaki | 400/708 |
| 2008/0007759 A1 * | 1/2008 | Furuyama et al. | 358/1.14 |
| 2008/0104685 A1 * | 5/2008 | Ishiguro et al. | 726/7 |
| 2008/0104707 A1 * | 5/2008 | Saka et al. | 726/26 |
| 2008/0184364 A1 * | 7/2008 | Ishiguro et al. | 726/19 |
| 2009/0019402 A1 * | 1/2009 | Ke et al. | 715/849 |
| 2009/0051497 A1 | 2/2009 | Miyaso | |
| 2009/0174900 A1 * | 7/2009 | Shigehisa et al. | 358/1.15 |
| 2009/0174901 A1 * | 7/2009 | Shigehisa et al. | 358/1.15 |

FOREIGN PATENT DOCUMENTS

| | | |
|---|---|---|
| JP | 2003-280469 | 10/2003 |
| JP | 2004-072343 | 3/2004 |
| JP | 2005-051796 | 2/2005 |
| JP | 2005-262864 | 9/2005 |
| JP | 2006-025255 | 1/2006 |
| JP | 2006-254123 | 9/2006 |
| JP | 2007-148854 | 6/2007 |
| JP | 2007-166225 | 6/2007 |
| JP | 2007166225 A * | 6/2007 |
| JP | 2007-174129 | 7/2007 |
| JP | 2007-180789 | 7/2007 |
| JP | 2007-201850 | 8/2007 |
| JP | 2007-249959 | 9/2007 |
| JP | 2007-251634 | 9/2007 |
| JP | 2007251634 A * | 9/2007 |
| JP | 2007324678 A * | 12/2007 |
| WO | WO 2007/105634 | 9/2007 |

OTHER PUBLICATIONS

U.S. Appl. No. 12/349,573, Kei Shigehisa et al.; Title: "Image Forming Device, Image Forming Method, and Image Forming Program"; filed Jan. 7, 2009.

U.S. Appl. No. 12/349,555, Kei Shigehisa et al.; Title: "Image Forming Device, Image Forming Method, and Image Forming Program"; filed Jan. 7, 2009.

* cited by examiner

IMAGE FORMING DEVICE, IMAGE FORMING METHOD, AND IMAGE FORMING PROGRAM

This application is based on an application No. 2008-001519 filed in Japan, the contents of which are hereby incorporated by reference.

BACKGROUND OF THE INVENTION

1. Field of the Invention

The present invention relates to an image forming device, and particularly relates to the image forming device in which an input of a password is requested to a user when executing a processing, and according to the inputted password, prescribed processing is executed.

2. Description of the Related Art

Along with a development of a network technology of recent years, an image forming device, for example, a digital multifunction peripheral has been utilized in such a manner as being shared by a plurality of users connected by a network in many cases. Here, the digital multifunction peripheral (MultiFunction Peripheral (MFP), Scan Print Copy (SPC), or All In one (AIO)) indicates the image forming device having at least two or more functions of a copier, a printer, a scanner, facsimile equipment, and so forth.

When an instruction of image forming processing is given to the digital multifunction peripheral (called simply multifunction peripheral hereafter), the user inputs the instruction to the multifunction peripheral body first hand and gives the instruction of processing for executing the multifunction peripheral by using an apparatus connected to the multifunction peripheral via the network and located away from the multifunction peripheral body.

Therefore, when a document is printed on a paper medium, etc, by the multifunction peripheral based on the instruction received from the user, a following problem may arise. That is, an outputted printed matter is left on a paper eject tray of the multifunction peripheral and exposed to human eyes. In such a case, there is a possibility that the printed matter is unexpectedly handed to an outsider. Such an event is a problem from a viewpoint of ensuring security of information.

JP 2005-51796 A discloses an image forming device capable of solving the aforementioned problem of ensuring security. By this image forming device, it is possible to realize a security management against leakage and storage of the information accumulated in a storage device.

This image forming device includes a section that sets a password for created image information, and a section that requests an input of the password when the instruction of printing and deleting the image information is inputted.

With this structure, the image forming device prevents the accumulated image information from being leaked and being unintentionally erased.

JP 2003-145889 A also discloses an image forming device. Even when a printout instruction is given by inputting a true password, this image forming device requests the input of the password for starting printout to the user again, in consideration of a waiting time until a resultant matter of this print processing is outputted from the printer. Therefore, when the image information for printout is inputted in the image forming device, this image forming device inhibits the printout of this information, until the password for starting printout is inputted.

This image forming device can be set so that the printout is not started until the password for starting the printout is inputted by the user, thus making it possible to collect a printed matter without allowing an outsider to peek at this printed matter.

Thus, it is a generally performed event to set the password to ensure the security of the printed matter.

However, in the aforementioned conventional image forming device, in order to make this apparatus execute a job such as copying and printing, a user must input a password to the image forming device after giving instruction of executing the job to the image forming device. Further, when a plurality of passwords are set in each page of the document, for example, to execute the job, the image forming device temporarily suspends the execution of the job every time the setting of the password is recognized until this job is completed, and requests input of the password to the user. Then, the user inputs the password every time the request is received. Accordingly, in the aforementioned image forming device, when at least one password is set for the job, the execution of the job is temporarily suspended at least once, and the input of the password by the user is awaited. This suspension duration prolongs duration from giving instruction of executing the job up to completion of this job, compared with a case in which the password is not set at all.

Therefore, duration required for holding the data related to one job in the data storage area of the image forming device is also prolonged. Accordingly, from the viewpoint of designing the image forming device, some measures are necessary, such as making the data storage area of the image forming device larger than prior art.

In addition, in the aforementioned conventional image forming device, for example, when the password is set in each page of the printout document including plural pages, or when the password is set in each one of a plurality of printout documents, the duration from giving instruction of executing the job up to completion of the job is more prolonged as the number of passwords to be inputted is increased. In such a circumstance, from the viewpoint of the user, it is desired that duration from sending a job execution instruction to the image forming device by the user, up to completion of the job is shortened to be similar to that of the case in which the password is not set at all, thus improving productivity of an image forming work in an office, etc.

SUMMARY OF THE INVENTION

An object of the present invention is to provide the image forming device capable of suppressing consumption of a hardware resource, particularly capable of suppressing occupancy of the data storage area such as a working memory to minimum, and improving the productivity of the image forming work, while ensuring the security equivalent to that of a conventional image forming device.

First aspect of the present invention is an image forming device that executes a job, being prescribed processing for image data of a document having page divisions, with execution of this job limited by a password set in an arbitrary page of the document. The image forming device includes: an image data input unit that sequentially receives the image data of the document in each page division; a set password acquisition unit that acquires set password information that is information regarding a set password from the image data of each page division received by the image data input unit; an input password receiving unit that starts reception of input of the password for canceling execution limit of the job by set password information acquired by the password acquisition unit, before the reception of the image data of all pages of the document is completed by the image data input unit; a password verification unit that performs verification between the password received by the input password receiving unit and the set password acquired by the set password acquisition unit; and a job execution unit that executes the job by using the image data by canceling the execution limit of the job limited by the set password information based on a verification result of the password verification unit, wherein, when the password is set in an arbitrary one page of the document and execution of the job is limited by the job execution unit, the image data input unit sequentially completes the reception of the image data of the next page of the arbitrary one page of the document even in a state in which the input password receiving unit does not receive the input of the password corresponding to the password set in the arbitrary one page.

Second aspect of the present invention is an image forming method in an image forming device that executes a job, being prescribed processing for image data of a document having page divisions, with execution of this job limited by a password set in an arbitrary page of the document. The image forming method includes: sequentially receiving the image data of the document in each page division; acquiring set password information that is information regarding a set password from the image data of each page division received in the receiving step; starting reception of input of the password for canceling execution limit of the job by the set password information acquired in the acquiring step, before the reception of the image data of all pages of the document is completed in the receiving; performing verification between a password received in the step of receiving the input of the password, and a set password acquired in the acquiring; and executing the job by using the image data by canceling the execution limit of the job limited by the set password information, based on a verification result in the performing verification, wherein, when the password is set in arbitrary one page of the document and the execution of the job is limited by the job execution unit, the reception of the image data of the next page of the arbitrary one page of the document is sequentially completed in the receiving the image data, even in a state in which the input of the password corresponding to the password set in the arbitrary one page is not received in the step of receiving the input of the password.

Third aspect of the present invention is a computer-readable medium storing a program that makes a computer execute image formation, the computer constituting an image forming device that executes a job, being prescribed processing for image data of a document having page divisions, with execution of this job limited by a password set in an arbitrary page of the document. The program includes: code that sequentially receives the image data of the document in each page division, by using an image data input unit; code that acquires set password information that is information regarding a set password, from the image data of each page division received by the image data input unit by using a set password acquisition unit; code that starts reception of input of a password for canceling execution limit of the job by set password information acquired by the password acquisition unit, before the reception of the image data of all pages of the document is completed by the image data input unit; code that performs password verification by using a password verification unit, between the password received by the input password receiving unit and the set password acquired by the password acquisition unit; and code that cancels the execution limit of the job limited by the set password information and executes the job by using the image data based on a verification result of the password verification unit, wherein, when the password is set in the arbitrary one page of the document and the execution of the job by the job execution unit is limited, the reception of the image data of the next page of the arbitrary one page of the document is completed by the image data input unit, even in a state of not receiving the input of the password corresponding to the password set in the arbitrary one page by the input password receiving unit.

In order to ensure the security, the image forming device of the present invention is capable of setting the password for the job such as the printout, and capable of starting the printout or the like after the input of this password is confirmed. Therefore, the image forming device of the present invention is a preferable image forming device from the viewpoint of ensuring the security. Further, it is possible to shorten the duration from the input of the password by the user up to completion of the printout than the above-described prior art image forming device. Therefore, usability is improved for the user, and the duration of holding the image data for printout is shortened for the image forming device.

The image forming device of the present invention exhibits an advantage that the use efficiency of the hardware resource of the image forming device is more improved than that of the conventional image forming device, while ensuring the security equivalent to that of the conventional image forming device having a conventional information protecting function by using the password, and the productivity of the image forming work by the user is more improved than that of the conventional image forming device.

BRIEF DESCRIPTION OF THE DRAWINGS

The above and further objects and novel features of the invention will more fully appear from the following detailed description when the same is read in connection with the accompanying drawings, and in which.

It is to be expressly understood, however, that the drawings are for the purpose of illustration only and are not intended as definitions of the limits of the invention.

DETAILED DESCRIPTION OF THE PREFERRED EMBODIMENTS

Preferred embodiments of the present invention will be explained hereunder, with reference to the appended drawings.

<Structure>

Figure 1:
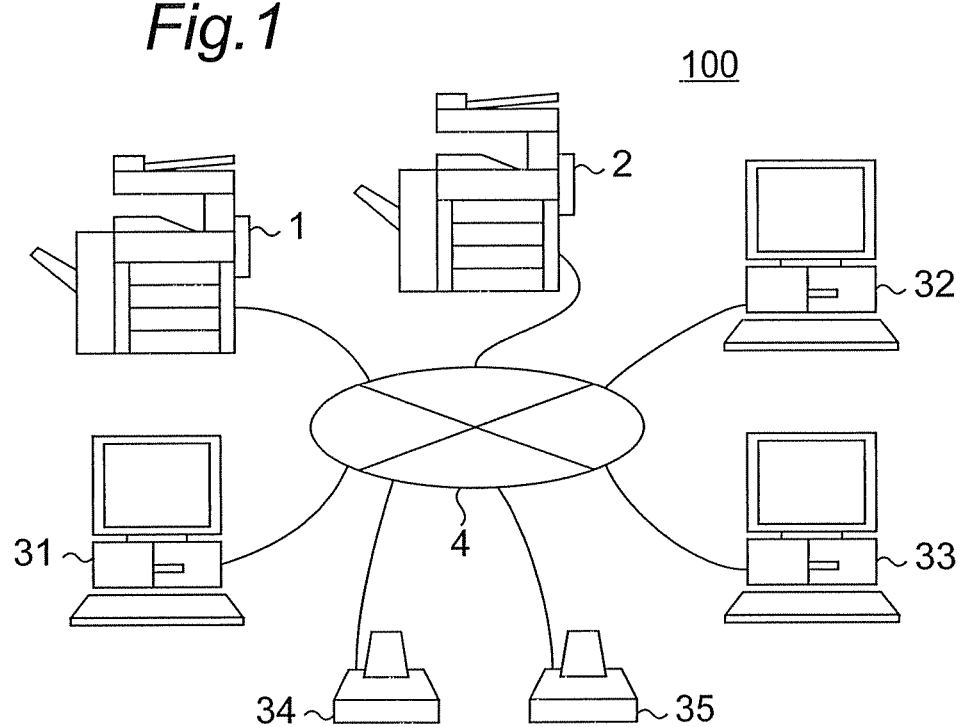
FIG. 1 is an outline diagram of an image forming system according to an embodiment of the present invention.

FIG. 1 is a schematic diagram of an image forming system 100 according to an embodiment of the present invention.

The image forming system has one or more multifunction peripherals (MFP) 1, 2, one or more personal computers (PC) 31, 32, 33, one or more facsimile terminals (FAX) 34, 35, and a network 4 mutually communicatively connecting the MFP (1, 2), PC (31, 32, 33), and FAX (34, 35). Each one of the MFP 1 and 2 constitutes the image forming device of the present invention. The network 4 is constituted of a network such as a local area network (LAN) or the Internet, or the network 4 may be constituted of a private communication line or a public communication line.

The MFP 1, 2, and PC 31, 32, 33 have apparatus identifying information within the network 4. The apparatus identifying information may be information specific to each apparatus and capable of specifying an exclusive apparatus based on the apparatus identifying information. The apparatus identifying information may have the names such as "PC001", "PC002", "PC003" for each one of the PC 31, 32, 33. The same thing can be applied for the MFP 1, 2. Also, instead of the aforementioned names, it is also possible to use an Internet protocol address (IP address) as the apparatus identifying information. In addition, telephone numbers for a telephone network such as a so-called fixed-line phone and an Internet protocol phone (IP phone) are given to each one of the FAX 34, 35.

Figure 2:
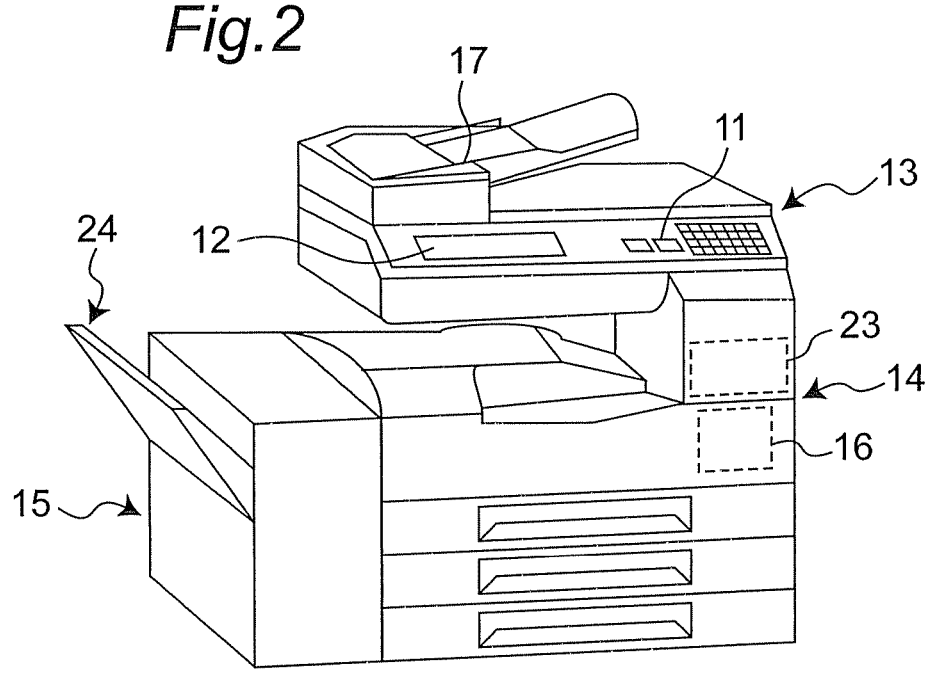
FIG. 2 is a perspective view of an MFP according to an embodiment of the present invention.

FIG. 2 is a perspective view of an outer appearance of the MFP 1.

The MFP 1 serves as the image forming device intensively provided with a copy function, a printer function (including network printing), a scanner function, a facsimile function, and a document server function, etc. It may be possible to set the MFP 1 so as to inhibit the user from using the MFP 1 when the user does not succeed in user authentication based on user information registered in an authentication server, etc, located in the MFP 1 or outside the MFP 1 and connected by the network 4, this user can not use the MFP 1.

The MFP 1 includes:

an operation unit 11 used in an input of an instruction, etc, by a user;

a display 12 that presents information to the user, etc;

a scanner unit 13 that photoelectrically reads image information of a paper medium, etc;

a printer unit 14 that prints the image information on the paper medium, etc;

a finisher unit 15 that ejects a printed paper medium;

a communication interface 16 that performs transmission/reception of the information to/from an external device via the network 4;

a document feeder 17 that sequentially feeds the paper medium, etc, to the scanner unit 13;

a sheet feeder (not shown) that feeds the paper medium to the printer unit 14;

a central processing unit (CPU) (not shown) that controls an operation of the MFP 1; and a random access memory (RAM) (not shown), read only memory (ROM) (not shown), a data storage unit 23, etc, that hold a program or data, etc.

The operation unit 11 includes:

key buttons for inputting numbers, characters, and symbols, etc, into the MFP 1;

a sensor for recognizing press-down of each key button; and a transmission circuit that transmits to the CPU a signal shown by the key button whose press-down is recognized by the sensor.

The display 12 displays:

a screen for providing a message and an instruction to the user;

a screen for inputting contents of the setting and processing by the user; and a screen for displaying an image formed by the MFP 1 or a result of the image forming processing, etc.

In the MFP 1 according to this embodiment, the display 12 serves as a touch panel. The display 12 has a function of detecting a location touched by the user on the display 12, and sending a detection result to the CPU, and constitutes a part of the operation unit 11.

The operation unit 11 and the display 12 constitute a user interface for directly operating the MFP 1. Meanwhile, an application program or a driver program for inputting the instruction to the MFP 1 are installed in the PC 31, 32, or 33 (FIG. 1). The user can remotely control the MFP 1 by operating the PC 31, 32 or 33.

The scanner unit 13 can generate the image data by photoelectrically reading the image information such as photographs, characters, pictures. The image data here is the data regarding density of the image. This image data is sent to an image processing unit (not shown), converted to digital data in the image processing unit, then subjected to each kind of known image processing and sent to the printer unit 14 and the communication interface 16, and is used for a print of the image or data transmission. Also, the digital data is sometimes stored in the data storage unit 23 for utilization thereafter.

The printer unit 14 prints the image data scan by the scanner unit 13, the image data received from the external device by the communication interface 16 via the network 4 (FIG. 1), and the digital data stored in the data storage unit 23, and so forth, in a recording medium such as a paper medium or a film medium. The sheet feeder 18 (not shown) is provided in a lower part of the MFP 1 body, and feeds the recording medium suitable for the printout to the printer unit 14.

The finisher unit 15 includes a stapler that performs staple processing to the paper medium, or a puncture that performs puncture processing to the paper medium, and so forth. The recording medium after executing print processing by the printer unit 14, namely a printed matter is subjected to the staple processing and puncture processing according to a print mode setting in the finisher unit 15, and is ejected to a tray 24.

Figure 3:
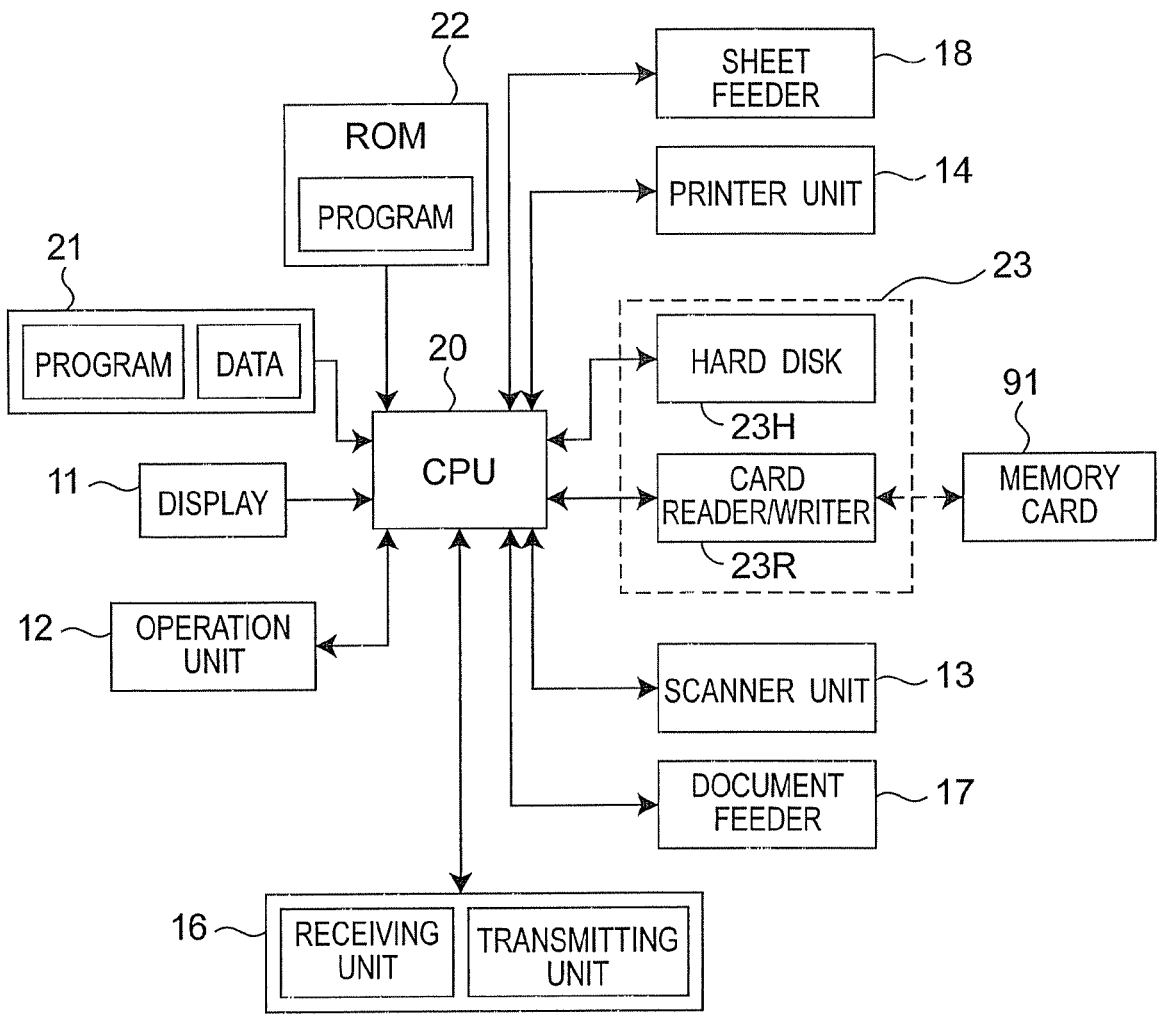
FIG. 3 is a block diagram illustrating a hardware structure of the MFP.

FIG. 3 is a block diagram of a hardware structure of the MFP 1.

The communication interface 16 includes a transmitting unit that transmits data to the external device and a receiving unit that receives the data from the external device. The MFP 1 can transmit/receive the data to/from the PC 31, 32, 33 (FIG. 1) and the FAX 34, 35 (FIG. 1) through the communication interface 16. A network interface card (NIC), a modem, a terminal adapter (TA), or the like, is given as examples of the communication interface 16.

The data storage unit 23 holds the program and data, etc. The data storage unit 23 includes a hard disk 23H and a card reader/writer 23R.

The card reader/writer 23R can read data or write data from/into a memory card 91 such as a compact flash (registered trademark), smart media (registered trademark) (SmartMedia (SM) or Solid State Floppy Disk Card (SSFDC)). By using the memory card 91, transmission/reception of data to/from the external device (such as PC 31, 32, 33) is possible not through the network 4. Also, by using the memory card 91, backup of the data in the MFP 1 is possible.

The hard disk 23H has an area for storing the digital data obtained by reading by means of the scanner unit 13, the digital data received from outside through the communication interface 16, and the data regarding the history of executed image processing (job) (job mode history). Also, the external device can refer to the digital data stored in the hard disk 23H through the communication interface 16.

<Functional Structure>

Figure 4:
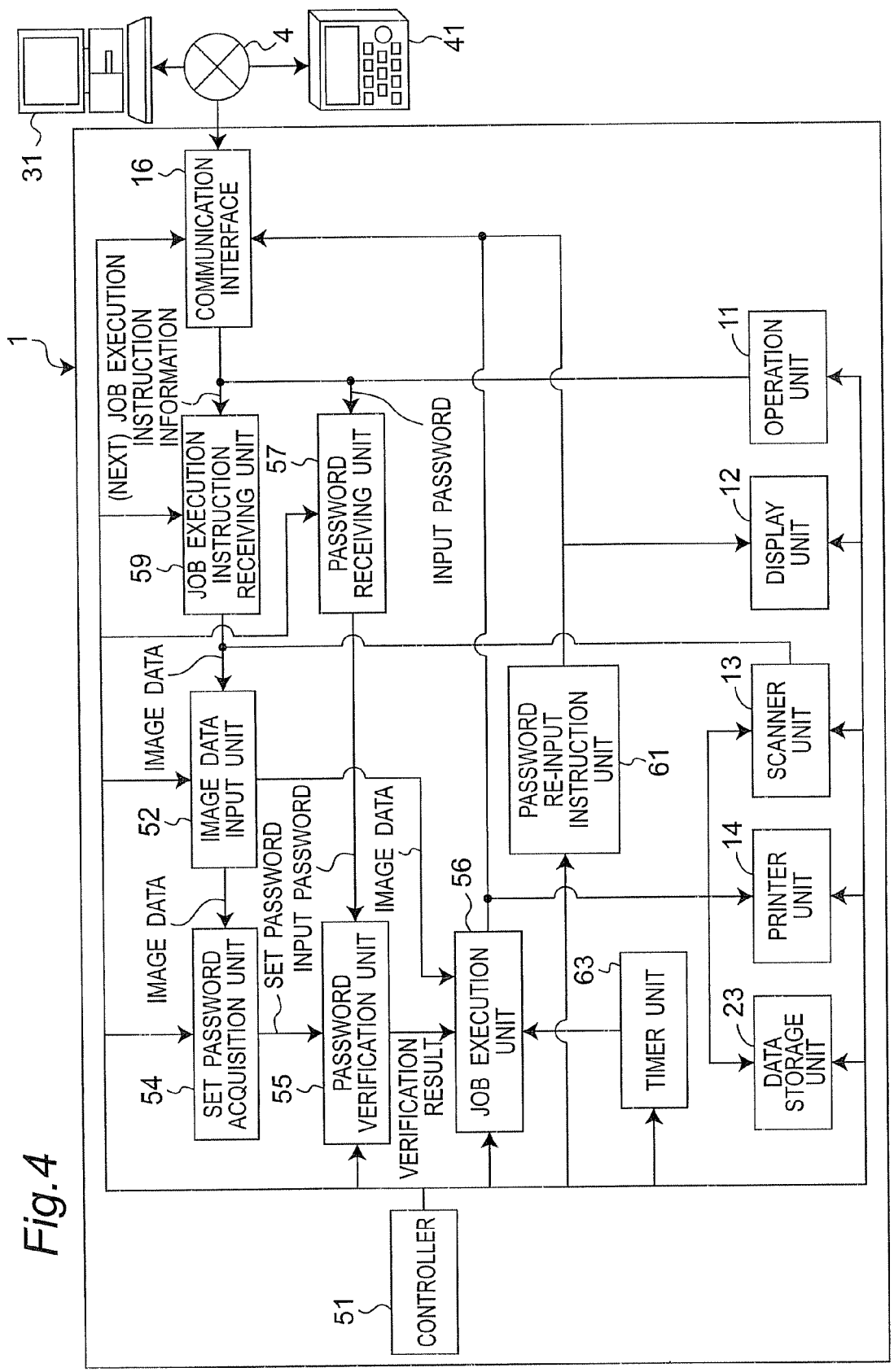
FIG. 4 is a block diagram illustrating a structure of the MFP viewed from a functional viewpoint.

FIG. 4 is a diagram of the structure of the multifunction peripheral (MFP) 1 from a functional viewpoint. The function of each block is realized by a program stored in RAM 21 or ROM 22, or the data storage unit 23 and is read and executed by the CPU 20, and each constituent element of the multi function peripheral 1 shown in FIG. 3. In addition, it may be also possible to provide a functional block realized by a dedicated hardware circuit. However, the functional block not directly related to the present invention is not shown in FIG. 4.

The MFP 1 executes a job, being prescribed processing (such as print processing) to the image data. At that time, the execution of this job can be restricted by the password directly set in this image data or the password stored in the MFP 1 or an external server in association with this image data. This password can be set in each page of the document including this image data or in an entire body of the document. Upon executing the job, the MFP 1 can interrupt the execution of the job protected by the password as described above, until the password is inputted from the outside. In addition, when a false password is inputted, the MFP 1 can execute prescribed processing such as automatically discarding this job.

The MFP 1 includes a controller 51, an image data input unit 52, a set password acquisition unit 54, a password verification unit 55, a job execution unit 56, a password receiving unit 57, a job execution instruction receiving unit 59, a password re-input instruction unit 61, and a timer unit 63, as functional blocks.

The controller 51 controls the operation of the MFP 1.

The image data input unit 52 receives the image data from the scanner unit 13, the data storage unit 23, or the communication interface 16. This image data may be the content of the document. In addition, the document may have page divisions. In such a case, the image data may be the image data of one page constituting the document, or the information of the image of plural pages may be included in one image data.

The set password acquisition unit 54 receives the image data of the document from the image data input unit 52, and acquires the password set in the page of the document expressed by the image data.

The password verification unit 55 performs verification between the set password acquired by the set password acquisition unit 54, and the input password received by the password receiving unit 57 as will be described later, then determines true/false of the password inputted by the user, and sends a verification result (determination result) to the controller 51.

When the password verification unit 55 so determines that the password inputted by the user is "true", based on this result, the controller 51 sends a prescribed instruction to the job execution unit 56. When the password verification unit 55 so determines that the password inputted by the user is "false", based on this result, the controller 51 can send a prescribed instruction to the password re-input instruction unit 61 and the job execution unit 56.

Based on the result of the verification performed by the password verification unit 55, the job execution unit 56 executes the job for the image data.

The password receiving unit 57 receives the input of the password from the operation unit 11 or the communication interface 16, and sends the received password to the password verification unit 55, as an input password.

The job execution instruction receiving unit 59 receives a job execution instruction from the operation unit 11 or the communication interface 16, and notifies the controller 51, etc, of the reception of this executing instruction. The job execution instruction is sent to the job execution instruction receiving unit 59 based on the input by the user such as press-down of "OK" button, or the like, displayed on the PC 31.

Note that, for example, in a case of the job of receiving the image data via the communication interface 16 and print-processing this image data, like a network printing, the image data used in executing the job is sent together with the executing instruction of the job. In such a case, the job execution instruction receiving unit 59 notifies the controller 51, etc, of the reception of the executing instruction of the job, and sends the received image data to the image data input unit 52 and the job execution unit 56.

The job execution instruction receiving unit 59 can also receive the executing instruction of the next job. Here, the executing instruction of the next job indicates the executing instruction of another job given by the MFP 1 during executing a certain job, so as to be executed after completion of the job that is being executed at present.

When the result of the verification between the set password and the input password in the password verification unit 55 indicates disagreement, the password re-input instruction unit 61 outputs the information for prompting the re-input of the password. The display unit 12, for example, is set as an output destination of this information. In addition, an external information processing apparatus can also be utilized as the output destination of this information, via the communication interface 16.

The timer unit 63 can measure elapsed time, with a prescribed timing set as a starting point. A measurement result is sent to the controller 51. Here, the prescribed timing to be the starting point can be set to be the timing when the password receiving unit 57 starts reception of the input of the password. In this case, the controller 51 can recognize the time from starting the reception process of the input of the password by the password receiving unit 57, up to the time when the input of the password is actually received. Then, when a prescribed time is elapsed from starting the reception process of the input of the password, the MFP 1 can perform processing such as discarding all image data necessary for executing the job, for example all image data received by the image data input unit.

For example, when the job execution instruction such as duplication of a paper medium original including plural pages is received, the MFP 1 according to the embodiment of the present invention starts to capture the image data of the page constituting this original. The capture of the data is performed by photoelectrically reading each page of the original by the scanner unit 13, and generating the image data. In parallel to capturing operation of the image data of each page, the MFP 1 performs operation of acquiring the password set in the image data of each page (set password), reception of the password inputted by the user (input password), and verification between the set password and the input password. In the MFP 1, generation of the sequentially generated image data is awaited, and then the operation of acquiring the set password is executed, based on this generated image data. However, both operations are simultaneously independently executed without influenced by mutual progress status. Similarly, the acquisition of the set password is awaited, and then the operation of reception of the input password and password verification is executed, based on this acquired set password. However, this operation may be also executed simultaneously independently of the aforementioned two operations. Therefore, in this MFP 1, irrespective of each progress of the processing of acquiring the set password, the processing of receiving the input password, and the processing of performing verification between the set password and the input password, the capture of all pages of the original constituting a confidential document printed matter can be completed. Accordingly, even when the password (input password) corresponding to the password (set password) set in arbitrary one page of the previously captured confidential document printed matter is not inputted by the user, capture of the successive original pages included in the confidential document printed matter is performed without suspending the capture of the original and the operation of generating the image data, and generation of the image data of all original pages can be completed. In this embodiment, although the capture of the image data is explained, with photoelectrical reading of the paper medium by the scanner unit 13 given as an example, the present invention is not limited thereto.

With this structure, in the MFP 1 according to the embodiment of the present invention, even when executing the job whose security is ensured by the password, the time occupied by this job can be suppressed to minimum for the hardware resource such as a memory (for example, RAM 21 (FIG. 3)). Also, when viewed from a user side, in the MFP 1 according to the embodiment of the present invention, the password can be inputted during capturing operation, simultaneously with the capture of the image data. This makes it possible to improve usability.

JOB EXECUTION EXAMPLE

The processing for executing the job by the MFP 1 will be explained hereafter.

Job Execution Example 1

Output Processing of Confidential Document Duplication

Hereafter, explanation will be given for a flow of the processing (so-called copy job) of the MFP 1, such as reading the confidential document printed matter protected by the password by the scanner unit 13, then generating the image data and outputting this image data from the printer unit 14. In this explanation, the copy job performed to the document of plural pages collectively placed on a document feeder 17 is regarded as one copy job. Namely, the image of the original including plural pages collectively placed on the document feeder 17 is the image necessary for executing this one copy job.

Figure 5A:
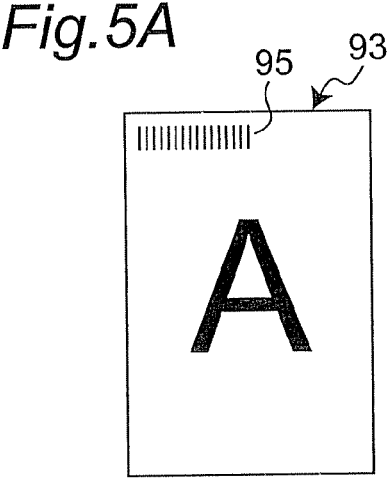
FIG. 5A is an example diagram of a confidential document printed matter embedded with confidential document information.
Figure 5B:
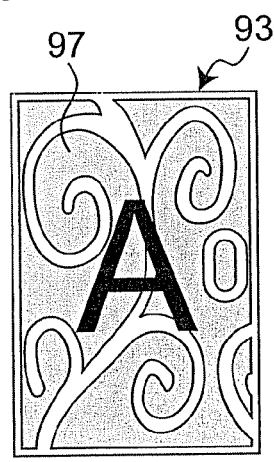
FIG. 5B is an example diagram of the confidential document printed matter embedded with the confidential document information.
Figure 5C:
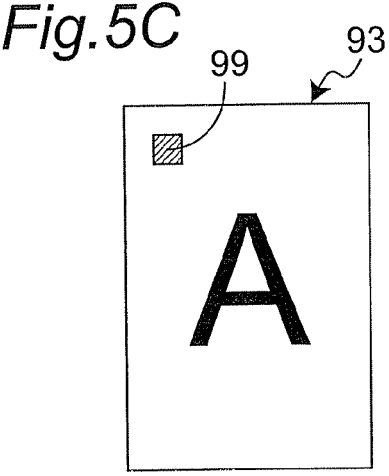
FIG. 5C is an example diagram of the confidential document printed matter embedded with the confidential document information.

First, the confidential document printed matter will be explained. The confidential document printed matter is the document having the form of the printed matter printed on the paper medium, and is the printed matter to which at least one page of the plural pages constituting the document is added (embedded) with the information (confidential document information) for ensuring the security, as additional data. FIG. 5A, FIG. 5B, and FIG. 5C are example diagrams of such a confidential document printed matter. In the aforementioned FIG. 3, a confidential document printed matter 93 is shown as if it includes only one page. However, the confidential document printed matter may be the printed matter including plural pages, and in these plural pages, confidential document information may be embedded in arbitrary plural pages. FIG. 5A is an example diagram of the confidential document printed matter 93 embedded with the confidential document information as a barcode 95. FIG. 5B is an example diagram of the confidential document printed matter 93 embedded with the confidential information as a background pattern 97. FIG. 5C is an example diagram of the confidential document printed matter 93 embedded with the confidential document information as an IC tag (IC chip) 99. Thus, the confidential document information can be embedded in the printed matter of the confidential document by means of the barcode 95, etc. When the confidential document information is embedded in the confidential document printed matter as the barcode 95 and the background pattern 97, the scanner unit 13 can scan the barcode, etc, indicating the confidential document information, by performing a normal photoelectrical image reading. When the confidential document information is embedded in the printed matter of the confidential document as the IC tag 99, the MFP 1 may include a sensor capable of electromagnetically reading the data stored in the IC tag 99, separately from the scanner unit 13.

Note that the confidential document information itself may be embedded in the printed matter of the confidential document in a method shown in FIG. 5A, FIG. 5B, and FIG. 5C. However, as an alternative method, it is also possible that only the information such as ID number, etc, is converted to data and is embedded in the printed matter of the confidential document as the barcode, etc, and the confidential document information is held in the MFP 1 or other device, and based on the ID number, the MFP 1 acquires the confidential document information.

Next, the confidential document information will be explained.

Figure 6:
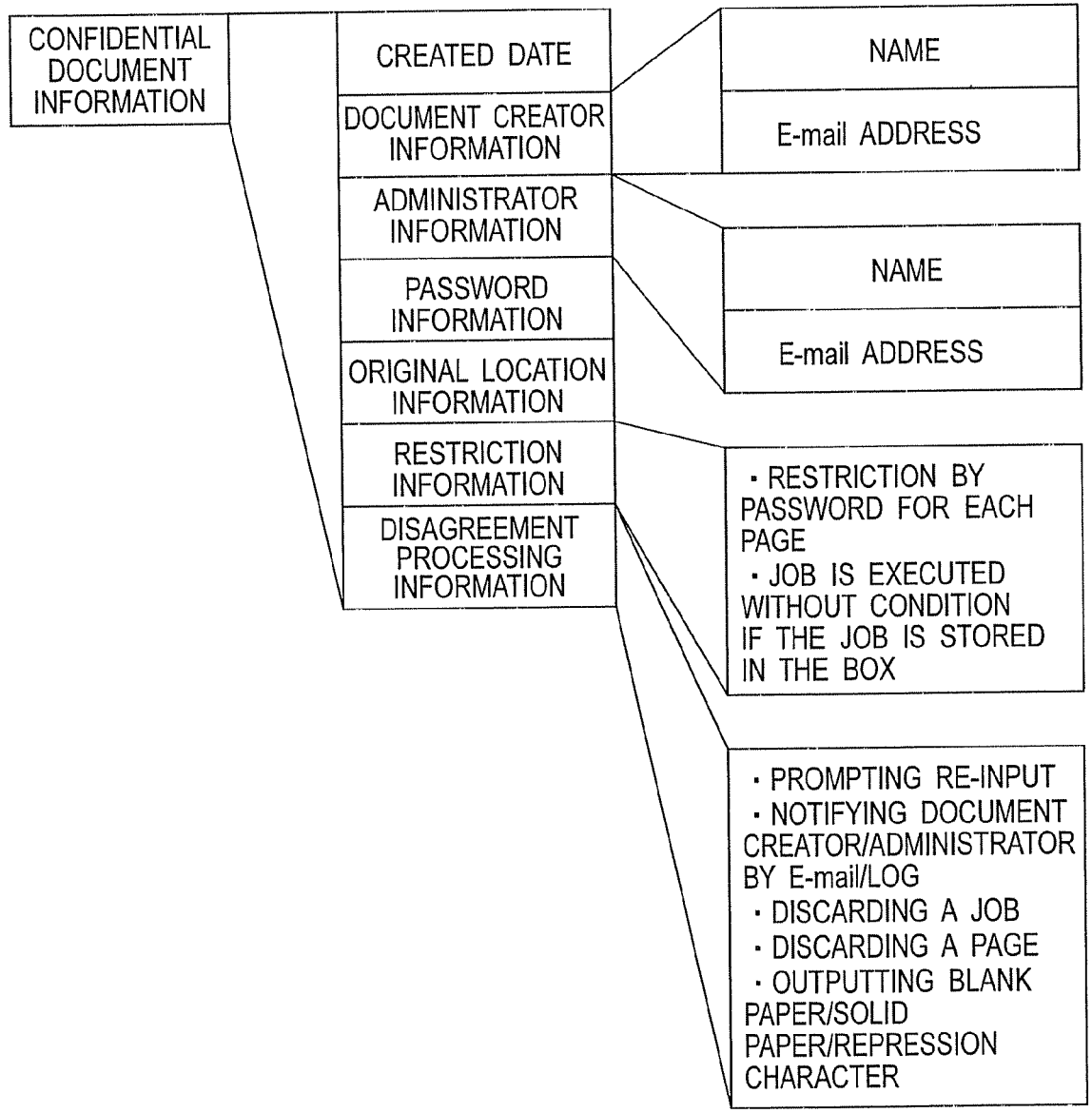
FIG. 6 is a diagram illustrating the structure of the confidential document information.

FIG. 6 is a diagram of a constitutional example of the confidential document information embedded in the confidential document printed matter as the barcode 95, etc. Note that as described above, such information can also be held in the data storage unit 23 of the MFP 1. In such a case, the barcode 95, etc, expresses the information indicating the correlation with the information held in the data storage unit 23.

The information (confidential document information) regarding the document can include:

created date indicating the date and time when the document is created;

document creator information indicating who creates the document;

administrator information indicating who manages the MFP 1;

password information indicating the password (set password) set in the document;

original location information indicating a location (storage location) of an original data file of the document;

restriction information indicating a limitation such as processing applied to the document; and disagreement processing information indicating the processing in a case of the password disagreement, and so forth.

The document creator information includes the name and E-mail address of the document creator. Also, the document creator information may include the information regarding other notifying means.

The administrator information includes the name and the E-mail address of a administrator of the MFP 1. Also, the administrator information may be held in the MFP 1, separately from the information regarding the document.

The restriction information is correlated with the password information, and includes the information regarding setting of the password in each page, or setting of the password in each job, and setting of the password in each kind of job. In the example of FIG. 6, this confidential document printed matter is set, so that the password is not set for the job only for storing the data file of the image into the MFP 1. Note that the restriction information may also be held in the MFP 1.

Disagreement processing information includes the information for designating the processing in a case where the password inputted by the user (input password) is not matched with the password indicated by the password information (set password). This processing can include processing contents such as prompting the re-input of the password, notifying the documents creator or the administrator by the e-mail or log, discarding the job concerning the password disagreement, discarding the page concerning the password disagreement, and performing output of blank paper/solid paper/repression characters.

Note that it is also possible that the restriction information and the disagreement processing information are not embedded in the confidential document printed matter but held in the MFP 1.

Figure 7:
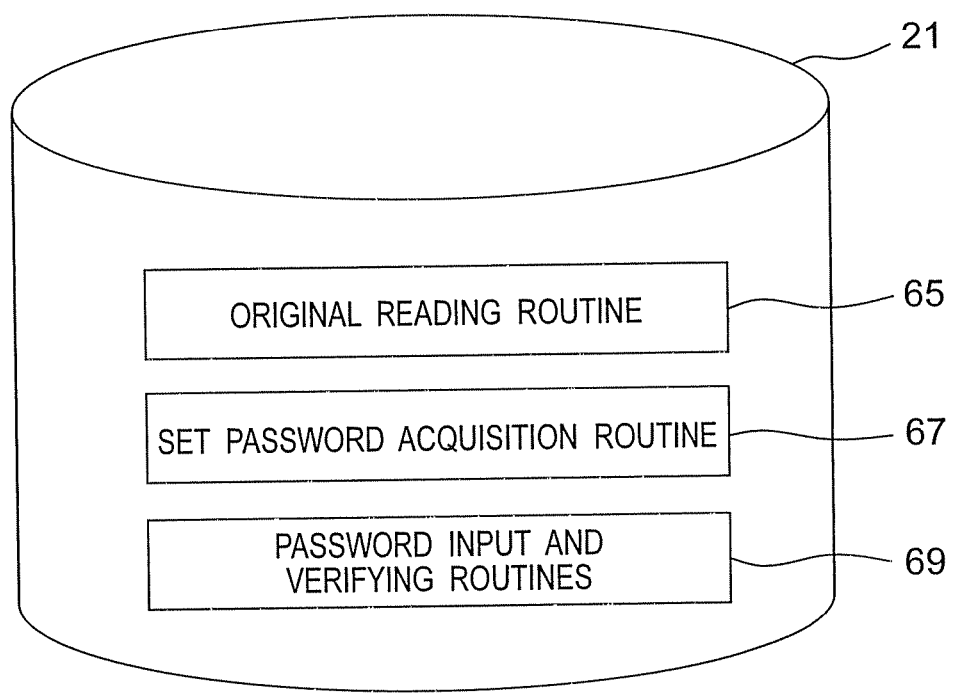
FIG. 7 is a schematic diagram illustrating the structure of an image forming program according to the present invention.

Next, based on FIG. 7, brief explanation will be given for a program executed in a computer of the MFP 1 according to the present invention. As shown in FIG. 7, an image forming program according to the present invention has three routines and for example, is held in the RAM 21 (or ROM 22 (both of them are shown in FIG. 3)). This program has an original reading routine 65, a set password acquisition routine 67, and a password input and verifying routines 69. These three routines 65, 67, 69 can be executed mutually independently, and in parallel in some cases, so that the data generated in a certain one routine can be utilized in other one routine.

The original reading routine 65 has a function of capturing the image of the original (such as the confidential document printed matter) having one page or plural pages from outside of the MFP 1, to generate the image data. This function includes a function of photoelectrically reading the original including plural pages placed on the document feeder 17 by the scanner unit 13, and thereby generating the image data of plural pages.

The set password acquisition routine 67 can receive the image data generated by the original reading routine 65. Then, the set password acquisition routine 67 has a function of acquiring the confidential document information embedded in the image data of arbitrary one page, and acquiring the password (set password) from the confidential document information.

The password input and verifying routines 69 can receive the confidential document information acquired by the set password acquisition routine 67 and the set password included therein. Then, the password input and verifying routines 69 has a function of receiving the password (input password) inputted by the user, for example, and a function of performing verification between the received input password and the set password, and outputting the verification result.

As a matter of course, the image forming program according to the present invention includes a code that provides a function not included in the aforementioned three routines. In addition, it is not always necessary to divide the image forming program according to the present invention into the aforementioned three routines. Preferably, the image forming program according to the present invention executes the function of reading the original including plural pages and thereby generating the image data, and the function regarding the acquisition of the set password and the verification between the input password and the set password, independently and in parallel in some cases.

Figure 8:
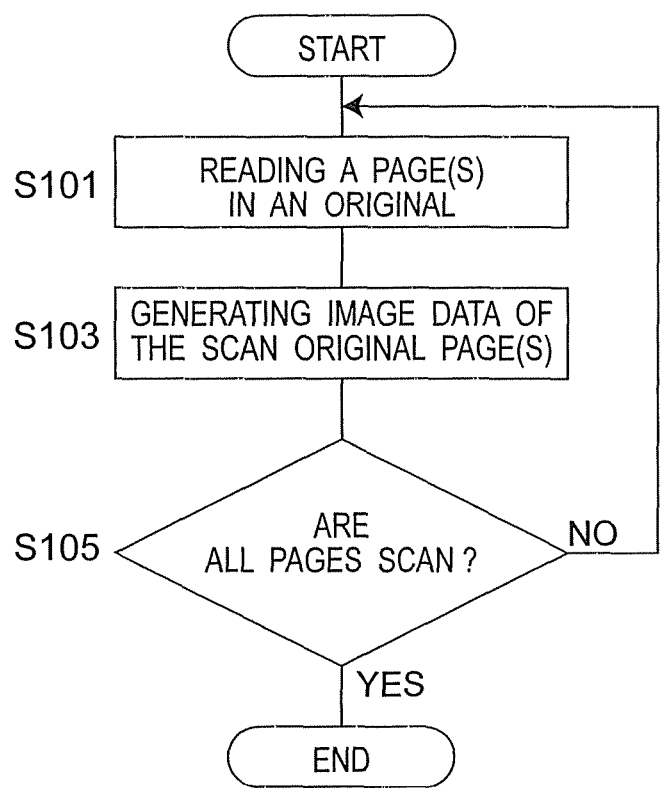
FIG. 8 is a flowchart of processing concerning original image reading.

FIG. 8 is a flowchart showing the flow from reading the original including plural pages up to generation of the image data by the original reading routine 65 (FIG. 7).

In connection with step S101, the user places the confidential document printed matter on the document feeder 17 (FIG. 3), and inputs the job execution instruction to the MFP 1 from the operation unit 11. Note that the job execution instruction may be inputted in a PC 31 or a mobile terminal 41 (FIG. 4). In addition, the confidential document printed matter may be placed on an external scanner device connected via the network 4. In this case, the image of the confidential document printed matter is sent to the image data input unit 52 (FIG. 4) through the communication interface 16 (FIG. 4).

The inputted job execution instruction is processed in the job execution instruction receiving unit 59, and original pages constituting the confidential document printed matter are sent to the scanner unit 13 from the document feeder 17 one by one.

In step S101, the scanner unit 13 photoelectrically reads the original pages one by one.

In step S103, the image data is generated from the scanned original pages, and is sent to the image data input unit 52 (FIG. 4).

In step S105, the MFP 1 determines whether or not all pages of the document placed on the document feeder 17 are sent to the scanner unit 13 and scanned by the scanner unit 13. When it is so determined that all original pages are scanned ("YES" in step S105), the processing is ended. When it is so determined that there exist the original pages not scanned yet ("NO" in step S105), the processing is returned to step S101, and unprocessed original pages are scanned.

Figure 9:
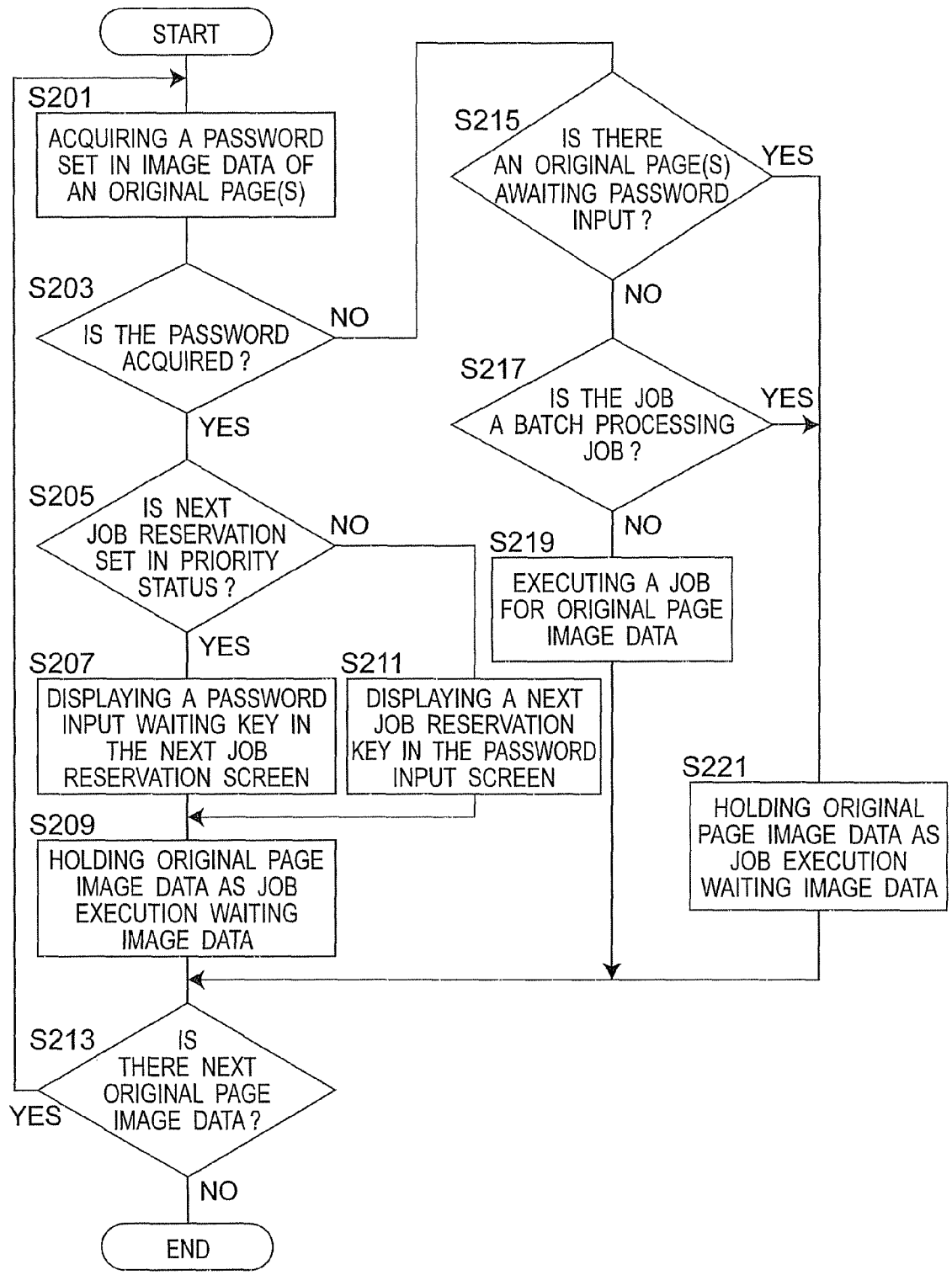
FIG. 9 is a flowchart of processing concerning acquisition of a set password.

FIG. 9 is a flowchart showing the processing of acquiring the set password from the image data of the original page, performed according to a setup status of the set password. The processing shown in this flowchart is realized by executing the set password acquisition routine 67 (FIG. 7) by the CPU 20 (FIG. 3) of the MFP 1. The processing shown in this flowchart can be executed independently of the processing shown in FIG. 8 or in parallel thereto in some cases.

In step S201, the set password acquisition unit 54 of the MFP 1 tries to acquire the information such as the set password by extracting the confidential document information from the image data of one page of the original pages.

In step S203, it is determined whether or not acquisition of the information such as the set password succeeds in step S201. When the acquisition of the information such as the set password succeeds ("YES" in step S203), the processing is advanced to step S205. When the acquisition of the information such as the set password fails ("NO" in step S203), the processing is advanced to step S215.

Note that when the set password acquired in step S203 is identical to the set password already acquired from the image data of the preceding original pages in the confidential document printed matter in the job that is being executed at present, it is possible to omit the reception of the input password with respect to the set password acquired from the image data of the original page that is being processed at present. In such a case, the program may be constituted, so that the determination in step S203 is "NO".

In step S205, the MFP 1 determines whether or not the reception of a reservation for the next job at present is set to be more prioritized than the reception of the input of the password. When it is so determined that the priority of the reception of the reservation for the next job is set to be more prioritized than the reception of the input of the password ("YES" in step S205), the processing is advanced to step S207. When it is so determined that the priority of the reception of the input of the password is more prioritized than the reception of the reservation for the next job ("NO" in step S205), the processing is advanced to step S211.

Here, the determination in step S205 is performed based on a priority flag previously set in the MFP 1. The priority flag is a flag that can be previously set by the user, and used for deciding whether or not the display for inputting the reservation for the next job is more preferentially displayed than the display for input of the password, as a display form of the display unit 12. When the setup is made so that the reception of the reservation for the next job is more prioritized, a next job reservation screen is displayed on the display unit 12 (FIG. 4). Reversely, when the setup is made so that the reception of the input of the password is more prioritized, a password input screen is displayed on the display unit 12.

In step S207, the MFP 1 displays a password input waiting key in the next job reservation screen displayed on the display unit 12.

Figure 10:
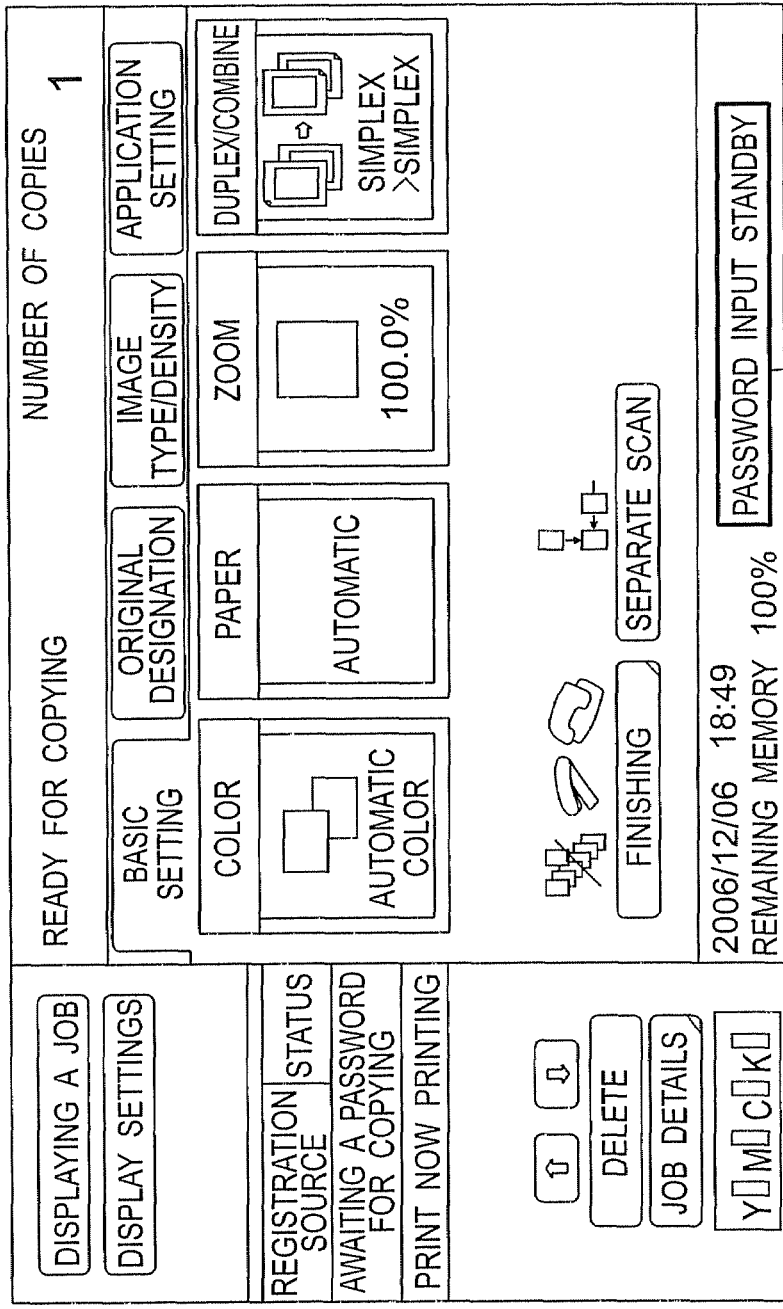
FIG. 10 is an example diagram of the next job reservation screen.

FIG. 10 is a diagram of the next job reservation screen (display unit 12) on which the password input waiting key 171 is displayed. Thus, when the setup is made so that the reception of the reservation for the next job is more prioritized, a key 171 for switching the display on the display unit 12 to the display of the password input screen is added to the next job reservation screen.

When the reservation for the next job is inputted before completion of the input of the password, the MFP 1 can start execution of the next job, before the execution of the jog that is being executed at present is completed. Thus, it is possible to have the effect that an influence on other job due to delay of the password input can be suppressed to minimum.

In FIG. 9 again, in step S209, the MFP 1 holds the image data of the original page whose set password is acquired, as job execution waiting image data.

In step S211, the MFP 1 displays a password input text box and a next job reservation key in a password input screen displayed on the display unit 12.

Figure 11:
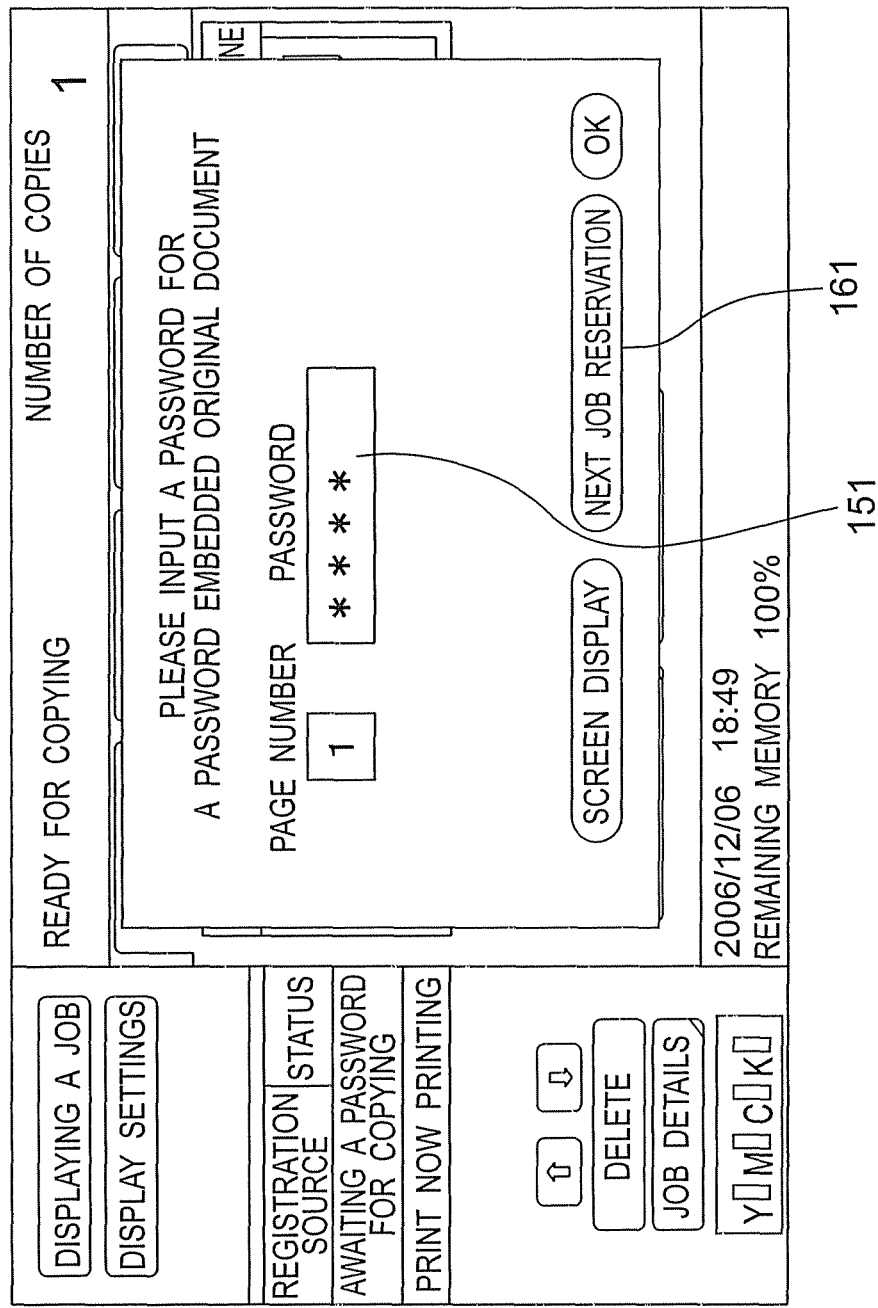
FIG. 11 is an example diagram of a password input screen.

FIG. 11 is a diagram of the password input screen (display unit 12) in which a password input text box 151 and a next job reservation key 161 are displayed. Thus, in a case of the setup in which the reception of the password input is more prioritized, the text box 151 for inputting the password is displayed, and further a key 161 for switching the display to the display of the next job reservation screen is displayed in the password input screen.

Figure 12:
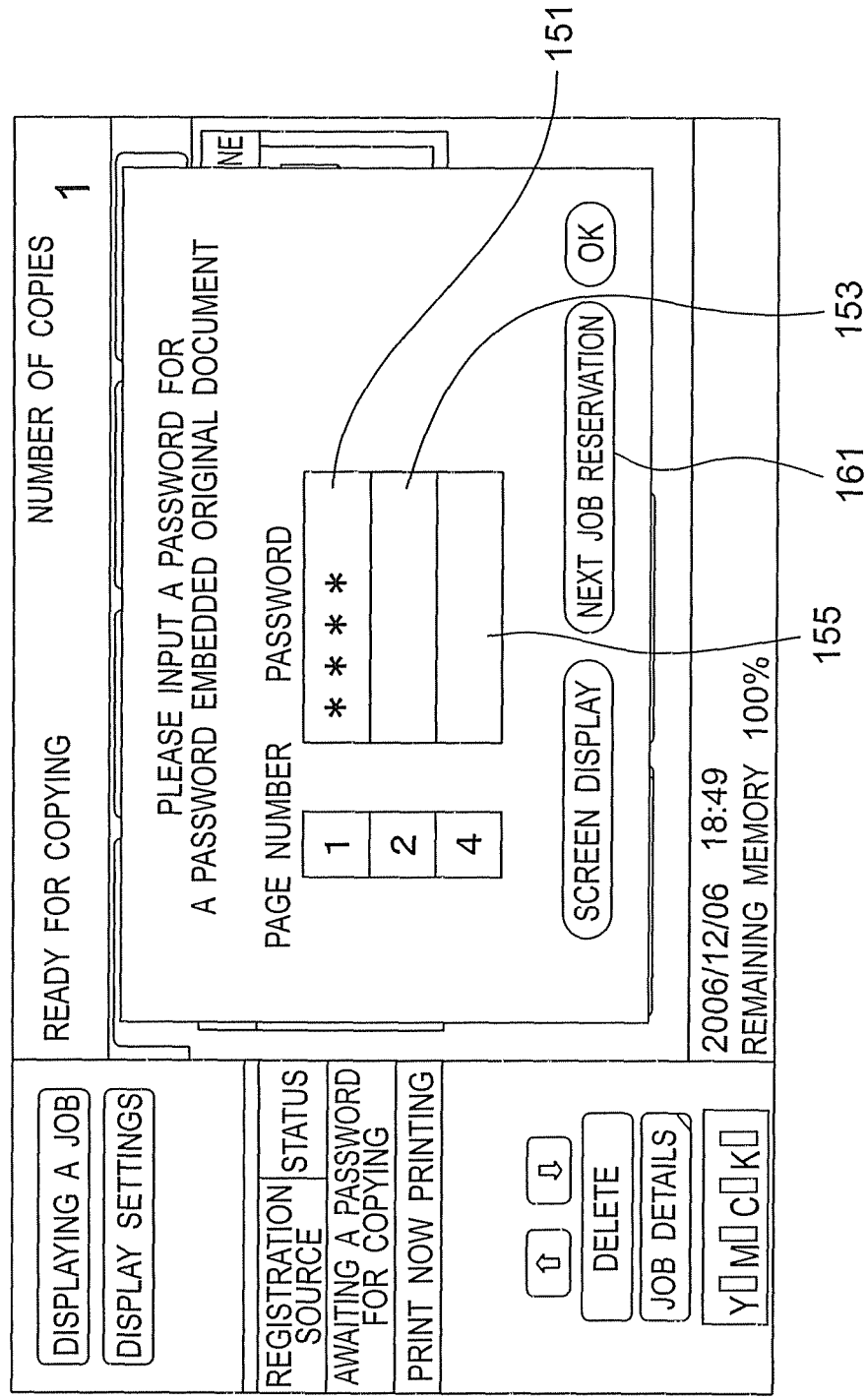
FIG. 12 is an example diagram of the password input screen.

FIG. 12 is a diagram of a display example of the password input screen, when the password is set in the image data of the original including plural pages respectively. In this example diagram, the password input text box 151 for the original page of page number 1 is displayed first, and subsequently, a password input text box 153 for the original page of the page number 2 is displayed, and a password input text box 155 for the original page of the page number 4 is additionally displayed. Thus, when the password is set in the image data of the original including plural pages, password input text boxes 151, 153, 155 for each of the pages are displayed.

Note that a thumbnail image of the original page, with password set, is displayed in the password input screen, and a preview image of the original page may be provided to the user. In this case, the MFP 1 may be constituted, so that the user touches the thumbnail image to select the original page for inputting the password, and then inputs the password in the selected original page. In addition, the thumbnail image of all original pages concerning the job may be displayed in the password input screen. In this case, the display form of the thumbnail image of the original page with password set is made different from the display form of the thumbnail image with no password set, thus notifying the user of the original page with password set. As an example of the different display form, in only the original page with password set, a specific mark may be added to the thumbnail image.

Figure 13:
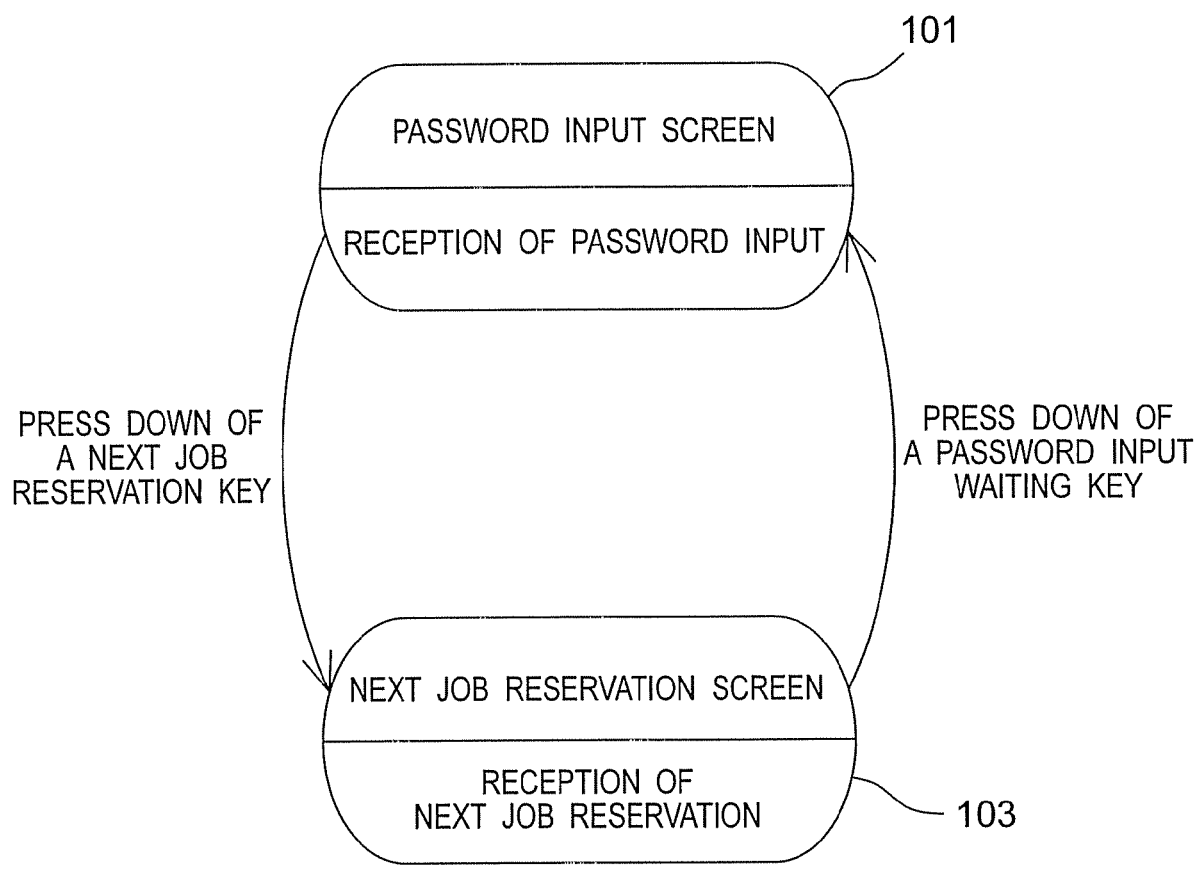
FIG. 13 is a display state transition diagram of a display unit.

FIG. 13 is a diagram schematically showing a transition of a display state in the display unit 12. In a password input screen display state 101, the reception of password input is executed. When the next job reservation key 161 (FIG. 11) is pressed down, the display state is moved to a next job reservation screen display state 103. In the next job reservation screen display state 103, the reception of the reservation for the next job is executed. When a password input waiting key 171 (FIG. 10) is pressed down, the display state is moved to the password input screen display state 101. In the password input screen state 101, when the user actually inputs the password, a password input and verifying routines 69 (FIG. 7) as will be described later is executed independently of the routine that is being executed at present and in parallel thereto in some cases.

In FIG. 9 again, in step S213, it is determined whether or not there is the image data of the next original page generated by the original reading routine 65. When it is so determined that there is the image data of the next original page ("YES" in step S213), the processing is returned to step S201. When it is so determined that there is no image data of the next original page ("NO" in step S213), the processing is ended once.

When the processing is moved from step S203 to step S215, in step S215, the MFP 1 determines whether or not there exists the original page waiting for the input of the password. When it is so determined that there exists the original page waiting for the input of the password ("YES" in step S215), the processing is advanced to step S221. When it is so determined that there exists no original page waiting for the input of the password ("NO" in step S215), the processing is advanced to step S217.

In step S217, the MFP 1 determines whether or not the job that is being executed at present is the batch processing job. Here, the batch processing job means the job including the processing of, for example, collectively putting together all original pages into one data file (PDF file, etc.). When it is so determined that the job that is being executed at present is the batch processing job ("YES" in step S217), the job is advanced to step S221. When it is so determined that the job that is being executed at present is not the batch processing job ("NO" in step S217), the job is advanced to step S219.

In step S219, the MFP 1 executes the job for the image data of the original page concerning the present processing.

In step S221, the MFP 1 holds the image data of the original page concerning the present job, as job execution waiting image data.

Thus, the set password acquisition routine 67 is operated independently of the original reading routine 65 and in parallel thereto in some cases, then executes the processing described in FIG. 9 such as acquisition of the set password, for each image data of the original page generated by the original reading routine 65.

Figure 14:
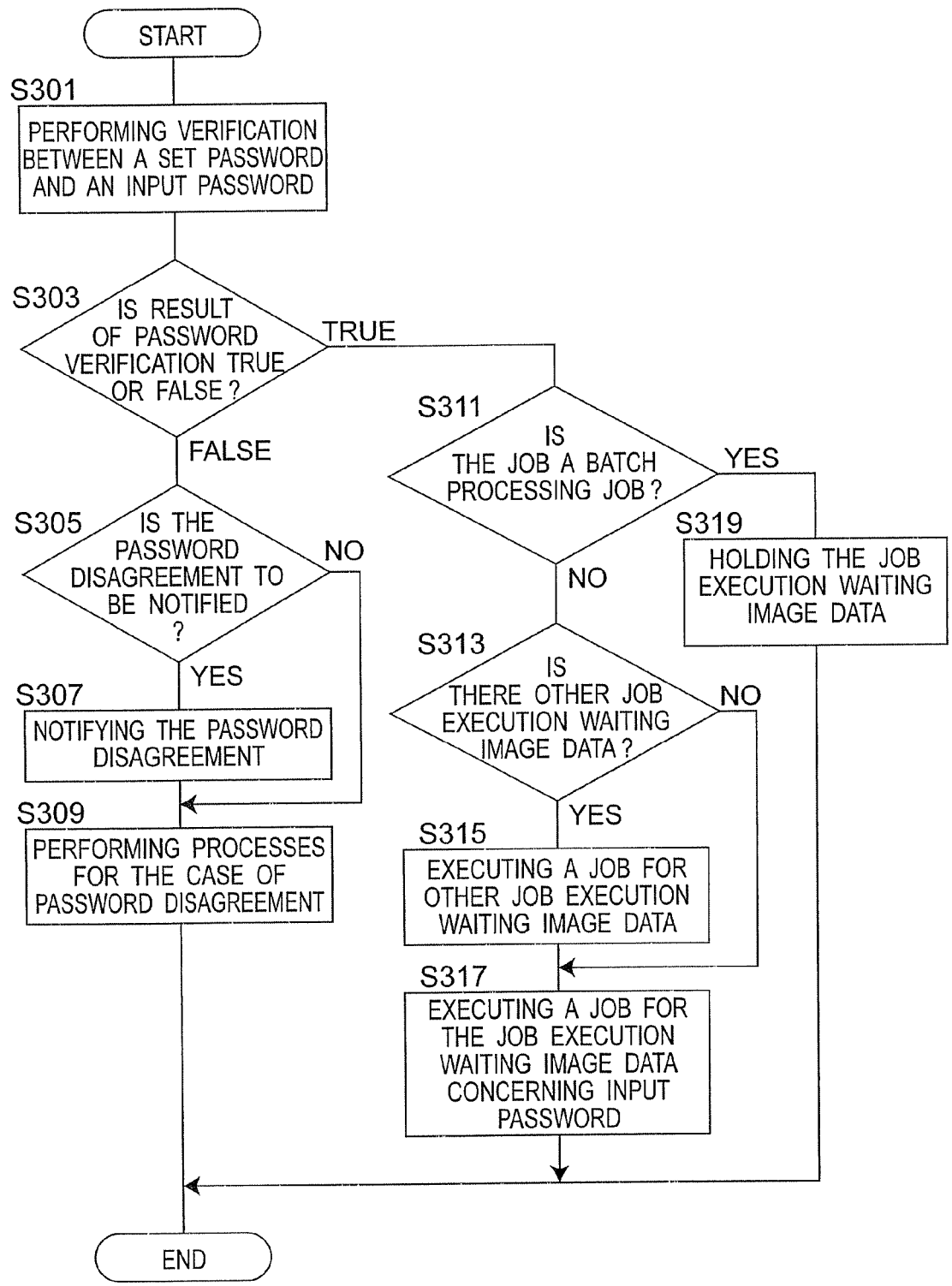
FIG. 14 is a flowchart of the processing concerning password input and password verification.

FIG. 14 is a flowchart showing the processing of receiving the input of the password by the user, then performing verification between the inputted password and the set password, and executing the job based on a verification result. The processing shown in this flowchart is realized by executing the input of the password and the verifying routines 69 (FIG. 7) by the CPU 20 of the MFP 1 (FIG. 3). The processing shown in this flowchart can also be executed independently of the processing shown in FIG. 8 and/or FIG. 9 and in parallel thereto in some cases.

In connection with step S301, the password is inputted from the operation unit 11 or an external information processing apparatus connected via the network 4.

In step S301, the password verification unit 55 of the MFP 1 performs verification between the password set in the original page (set password) and the password inputted by the user (input password).

In step S303, the MFP 1 determines the verification result in step S301. When this determination result indicates "true" ("TRUE" in step S303), the processing is advanced to step S311. When the determination result indicates "false" ("FALSE" in step S303), the processing is advanced to step S305.

In step S305, the MFP 1 determines whether or not the occurrence of the "password disagreement" is notified to the creator or the administrator by E-mail or log based on the restriction information or the disagreement processing information of the confidential document information. When the MFP 1 so determines that the occurrence of the password disagreement should be notified ("YES" in step S305), the processing is advanced to step S307. When the MFP 1 so determines that the occurrence of the password disagreement should not be notified ("NO" in step S305), the processing is advanced to step S309.

In step S307, the MFP 1 performs the processing of notifying a set person (creator or administrator) of the occurrence of the event "password disagreement" by set means (E-mail or log).

In step S309, the MFP 1 performs the processing for the job that is being executed at present in a case of the occurrence of the password disagreement. The content of the processing here complies with the disagreement processing information of the confidential document information.

For example, when the re-input of the password is set as the processing in the case of the occurrence of the password disagreement, the password re-input instruction unit 61 of the MFP 1 displays a message of prompting the re-input of the password on at least one of the display unit 12 of the MFP 1, an application (such as web and browser) that can be executed by the display unit 12 of the MFP 1 or an apparatus connected to the MFP 1 through the network 4, such as the PC 31 and mobile terminal 41 (FIG. 4), and a dedicated terminal. Here, the number of times of re-inputs of the password may be limited, such as three times as the re-inputs of the password. In addition, in order to understandably notify the user of which page is not matched with the password, this page may be thumbnail-displayed or the preview-displayed.

As another example of the processing in step S309, for example, the job concerning the disagreement of the password and the image data of the original page are deleted from a working memory of the MFP 1, and it may be possible to perform the processing of stopping the job concerning the disagreement of the password and the job concerning the original page, or it may be possible to output blank paper/solid paper/repression characters, instead of the printout of the original page of the confidential document printed matter. A message of suppressing output is notified to the user by the repression characters, for protecting the printed matter by password. Here, to perform the processing of deleting the data from the working memory is advantageous from the viewpoint of efficient use of the hardware resource, because an occupied area of the memory is partially opened from this time point.

In addition, when executing the job set as the job not requiring the input of the password (such as a job only for storing its data file into the MFP 1, explained in details of the aforementioned restriction information as described above), the job may be executed in step S311 instead of step S305, even in the case where the password disagreement occurs.

When the processing is moved to step S311 from step S303, in step S311, the MFP 1 determines whether or not the job that is being executed at present is the batch processing job. When it is so determined that the job that is being executed at present is the batch processing job ("YES" in step S311), the job is advanced to step S319. When it is so determined that the job that is being executed at present is not the batch processing job ("NO" in step S311), the job is advanced to step S313.

In step S313, the MFP 1 determines whether or not the job execution waiting image data exists at present, other than the image data of the original page concerning the password verification. When it is so determined that this data exists ("YES" in step S313), the processing is moved to step S315. When it is so determined that this data does not exists ("NO" in step S313), the processing is moved to step S317.

In step S315, the MFP 1 executes the job for the job execution waiting image data other than the image data of the original page concerning the password verification.

In step S317, the MFP 1 executes the job for the image data of the original page concerning the password verification.

In step S319, the MFP 1 holds the image data of the original page concerning the password verification as the job execution waiting image data.

Note that in step S303, when the already verified password is set in the original page to be verified, the processing may skip step S301 and step S303 and may be advanced to step S311.

Figure 15:
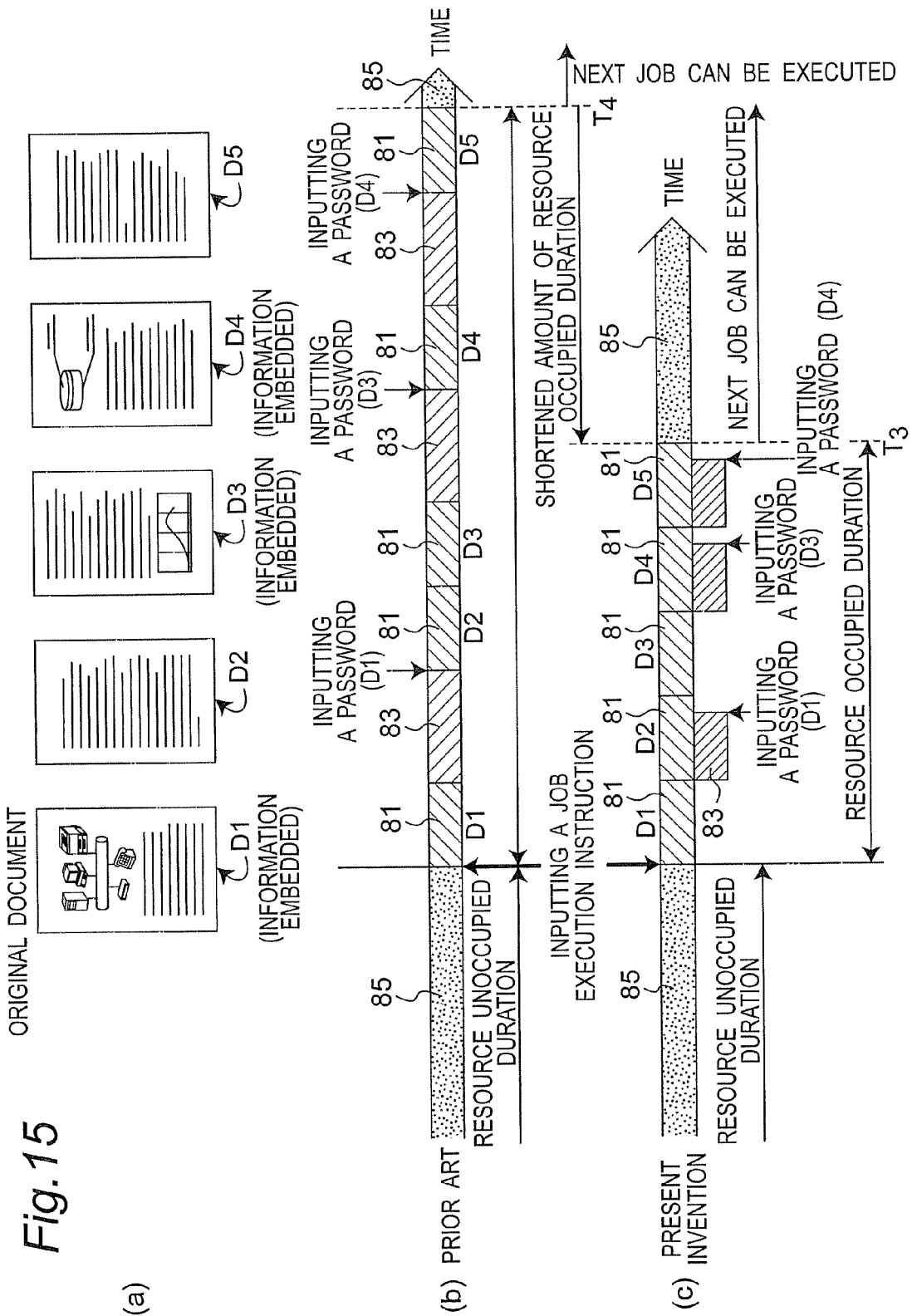
FIG. 15 is a diagram comparing the processing according to the present invention with the processing according to a prior art example relating to processing time.

FIG. 15 is a diagram comparing a prior art image forming device capable of executing a password set job, and the MFP 1 according to the embodiment of the present invention capable of executing a password set job along a time line.

The horizontal axis in this figure indicates a time axis. As shown in FIG. 15(c), in the MFP 1 according to the embodiment of the present invention, a required password is inputted into the MFP 1, in parallel to reading the original pages of the confidential document printed matter (D1 to D5). Then, the MFP 1 executes this job. The execution of the job is expressed as job execution duration 81 in the figure.

Meanwhile, in the prior art image forming device, as shown in FIG. 15(b), reading of the original pages (D1 to D5) of the confidential document printed matter is suspended in duration for waiting for the input of the required password. Reading suspension duration for input of the password is expressed as duration 83 in the figure.

Thus, in the prior art image forming device, there is an original page reading operation suspension time for input of the password (password waiting duration 83). As a matter of course, even in this duration, at least a part of the hardware resource (such as a working memory) is occupied by the data for this job (such as image data). Therefore, duration in which the hardware resource is occupied by this job corresponds to the sum of the duration 83 and the job execution duration 81. Meanwhile, in the MFP 1 according to the embodiment of the present invention, the duration in which the hardware resource is occupied by this job can be set to be the time (duration 81) required for executing the job only. This is because in the MFP 1 according to the present invention, the user can input the password, in parallel to reading operation of the original page performed by the MFP 1. Thus, in the present invention, the occupied time of the hardware resource is shortened. In addition, when the input of the job execution instruction is set as a base point, generally job execution completion time becomes earlier in the case of the present invention than the prior art image forming device. This is an advantageous point specific to the present invention that contributes to the improvement of usability.

Job Execution Example 2

Scan Processing by Using TWAIN Technical Standard

Thus, explanation will be given for the processing in a case of giving an instruction of executing a scan job to the MFP 1 from the PC 31, by using an application programming interface (API) based on the TWAIN technical standard mounted on the PC 31 (FIG. 1), and executing the scan job in the MFP 1. In this processing, the output of the image data to the PC 31 from the MFP 1 is limited by the password set in the original page of the confidential document printed matter (set password).

When the instruction of executing the scan job is given to the MFP 1 from the PC 31 and the mobile terminal 41 (both of them are shown in FIG. 4), the MFP 1 executes the processing explained with reference to FIG. 8, and generates the image data for the original page of the confidential document printed matter.

The MFP 1 executes the set password acquisition routine 67 (FIG. 7) independently of the execution of the aforementioned original reading routine 65 (FIG. 7) and in parallel thereto.

Figure 16:
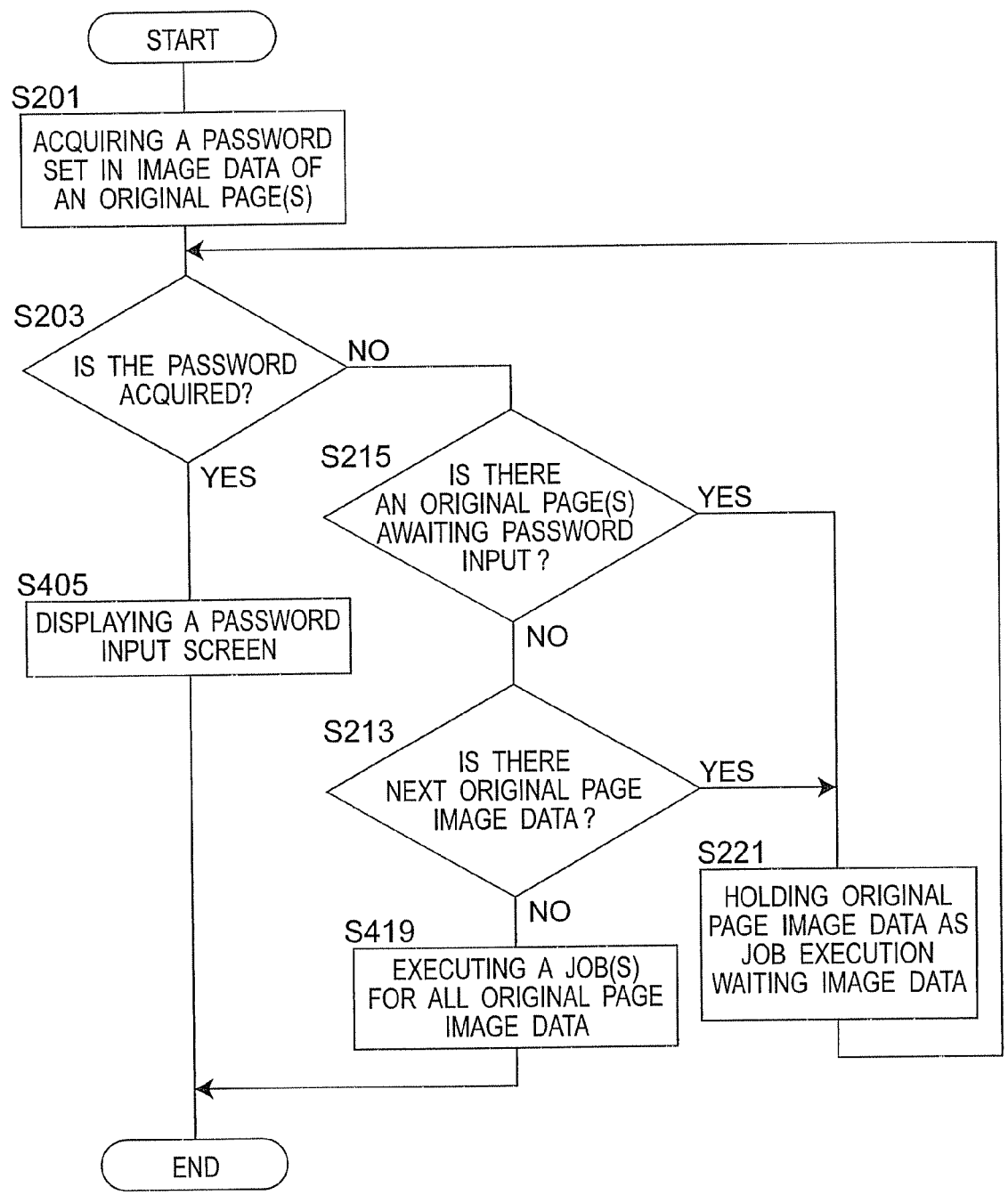
FIG. 16 is a flowchart of the processing concerning acquisition of the set password.

FIG. 16 is a flowchart showing the processing of the set password acquisition routine executed by the MFP 1 in the scan job based on TWAIN.

The processing in this figure is approximately the same as the processing flow explained with reference to FIG. 9. Regarding the step including the same processing contents, the same reference numerals are assigned thereto, and explanation therefore is omitted.

In step S203, when it is so determined that the MFP 1 acquires the password from the image data of the original page, the processing is moved to step S405.

In step S405, the MFP 1 requests the display of the password input screen to the PC 31 or the mobile terminal 41.

Figure 17:
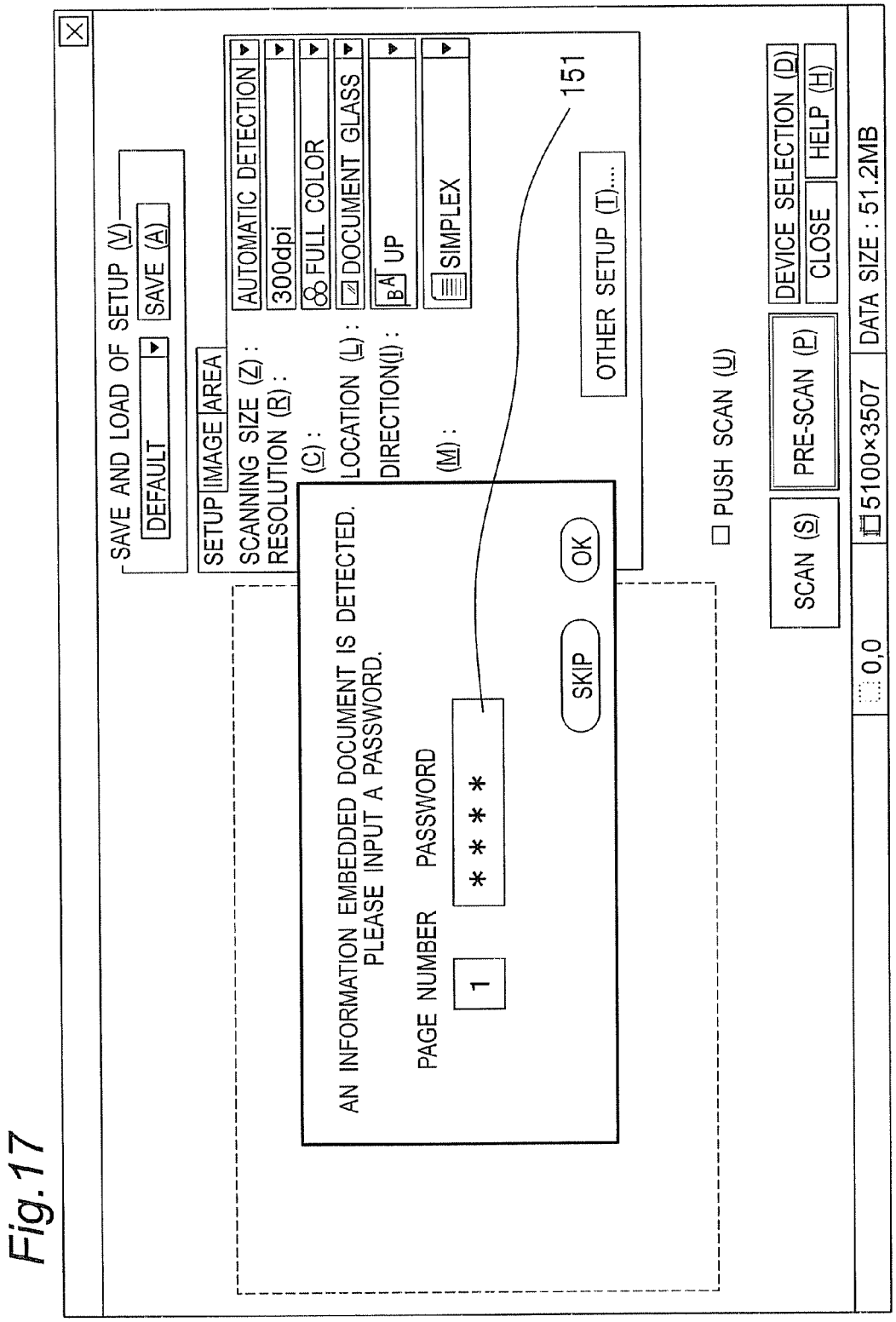
FIG. 17 is an example diagram of the password input screen displayed in a PC, etc.

FIG. 17 shows a display example of the password input screen displayed on the display such as the PC 31 by the processing in step S405. This display example shows the password input text box 151. By inputting the password suitable for the text box 151, the user can give the instruction of executing the processing for this original page limited by the password, to the MFP 1. Thus, when the original page, with the password set, is scanned by the MFP 1, the password input screen is displayed on the display such as the PC 31.

Figure 18:
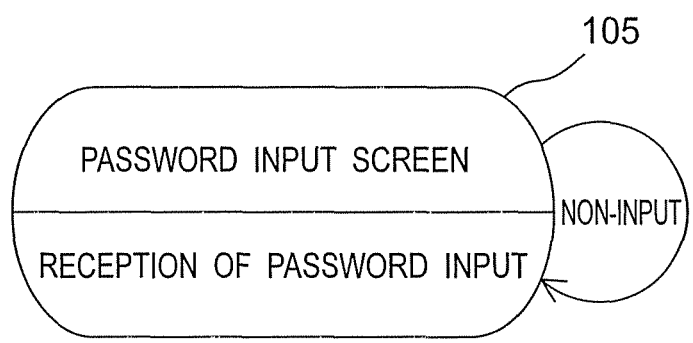
FIG. 18 is a state transition diagram of a display state of the PC, etc.

FIG. 18 is a diagram of a transition of state of the screen displayed on the display such as the PC 31. Unlike the case explained with reference to FIG. 13, here, the password input screen is always displayed on the display such as the PC 31, and the reception of the password input is executed. Unless the password is inputted (transition condition: "non-input"), a password input screen display state 105 is continued on the display.

In FIG. 16 again, when the MFP 1 completes the execution of the set password acquisition routine 67 (FIG. 7) for all original pages and confirms that no password is set, the MFP 1 executes the job for the image data of all the original pages concerning the scan job in step S419.

Figure 19:
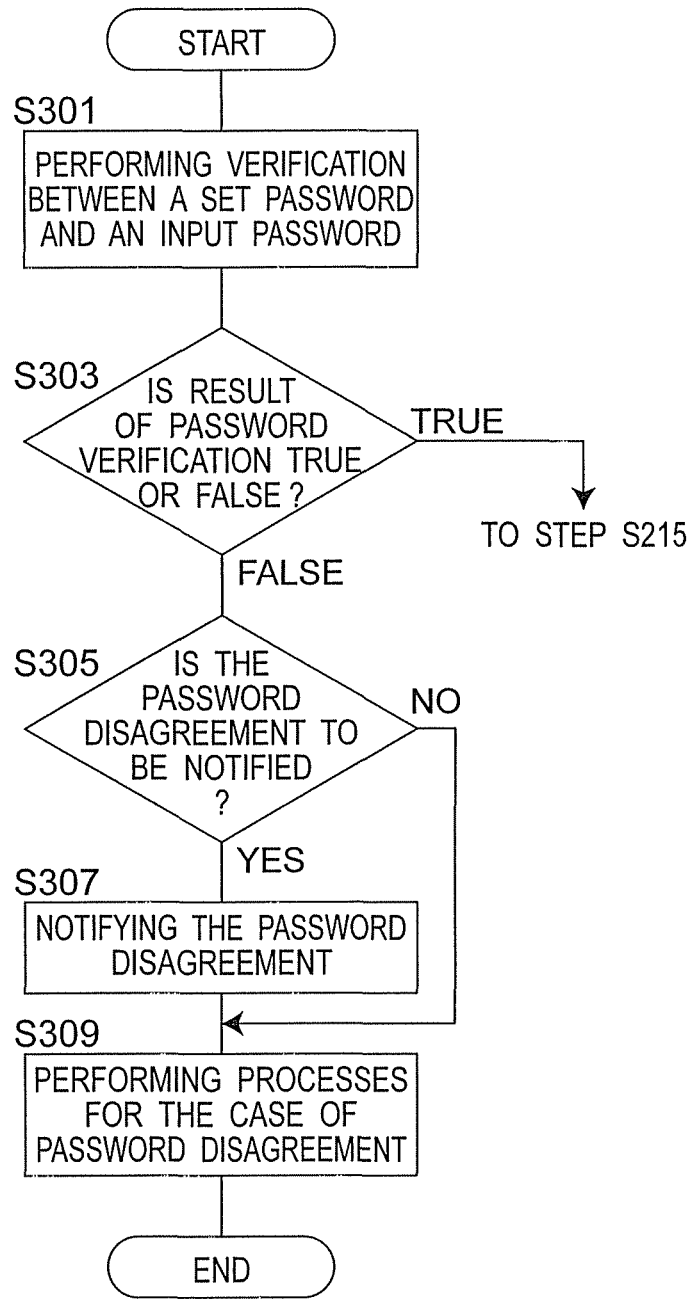
FIG. 19 is a flowchart of the processing concerning the password input and password verification.

FIG. 19 is a flowchart showing the password input and verifying routines 69 (FIG. 7) executed by the MFP 1 in the scan job based on TWAIN.

The processing in this figure is approximately the same as the processing flow explained with reference to FIG. 14. The same reference numerals are assigned to the step including the same processing contents, and explanation thereof is omitted.

In step S303, when the verification result of the password is "true" ("TRUE" in step S303), the MFP 1 executes the processing flow similar to that after step S215 of the flowchart shown in FIG. 16.

Thus, in the scan job based on TWAIN, the processing flow is constituted, so that at a point when password verification is completed for the image data of all the original pages, the processing limited by the password is executed.

Job Execution Example 3

Confidential Document Original Data Printout Processing

Finally, an example of executing the job is described, in which the MFP 1 reads the confidential document printed matter protected by the password in the scanner unit 13; then generates the image data; acquires the confidential document information from the image data; acquires original location information in addition to the information of the set password from the confidential document information; searches an original data file of the confidential document stored in the data storage unit 23 of the MFP 1; and executes the job by using the original data file of the confidential document.

The original data file of the confidential document printed matter can include the data representing a document body and the information regarding the document. The information regarding the document includes the information regarding the created date, the password, and the processing in the case of the password disagreement. Note that the information regarding this document may be stored in this data storage unit 23 by the MFP 1, separately from the original data file. In this case, the information regarding the document can be omitted from the original data file of the confidential document. The MFP 1 can read the information regarding the corresponding document from the data storage unit 23, based on the file name, etc, of the original data file.

In this job execution example, the original reading routine 65 and the set password acquisition routine 67 (both of them are shown in FIG. 7) are the same as the processing explained respectively, with reference to FIG. 8 and FIG. 9. Here, the explanation for the processing concerning these routines 65 and 67 is omitted. Note that in this job execution example also, the original reading routine 65, the set password acquisition routine 67, and the password input and verifying routines 69 can be respectively mutually independently executed. These routines are executed simultaneously in parallel in some cases.

Note that the set password may be not only the password for limiting prescribed processing for the confidential document printed matter but also the password for limiting access to the data storage unit 23 (called "box") in which the original data file of the confidential document is stored.

Figure 20:
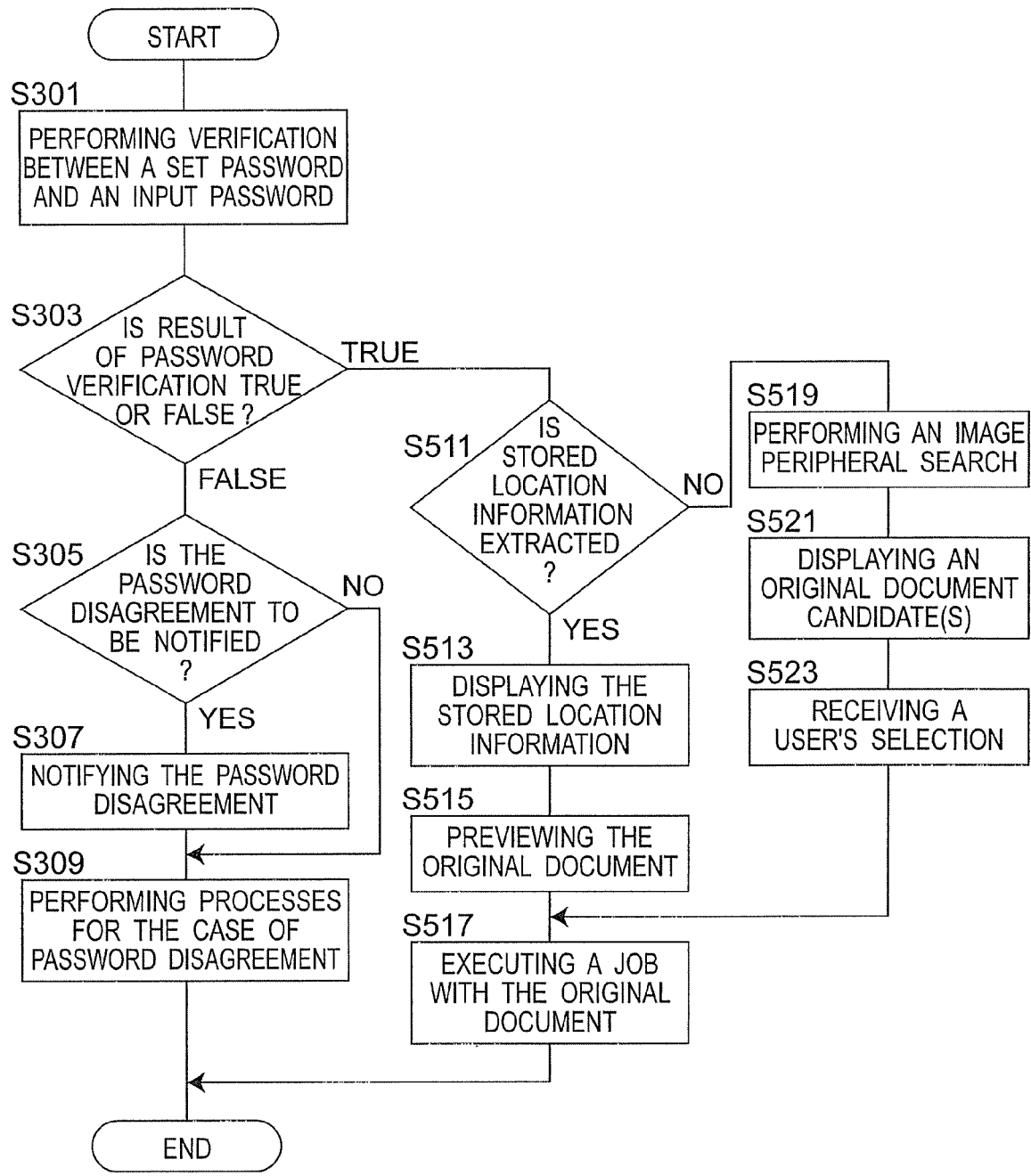
FIG. 20 is a flowchart of the processing concerning the password input and password verification.

FIG. 20 is a flowchart regarding the processing of the password input and verifying routines 69 (FIG. 7) in this job execution example.

The processing in this figure includes the same step as the processing explained with reference to FIG. 14. The same signs and numerals are assigned to the same step, and the explanation thereof is omitted.

In step S303, the MFP 1 determines the verification result in step S301. When this determination result is "true" ("TRUE" in step S303), the processing is advanced to step S511.

In step S511, the MFP 1 determines whether or not the original location information included in the confidential document information is extracted from the original page image data obtained by scanning. When the original location information is extracted ("YES" in step S511), the processing is advanced to step S513. When it is not extracted ("NO" in step S511), the processing is advanced to step S519.

In step S513, the MFP 1 displays the original location information on the display unit 12.

Then, in step S515, the MFP 1 preview-displays the original data file of the confidential document printed matter on the display unit 12.

Then, in step S517, the MFP 1 executes the execution-instructed job, for the original data of the confidential document printed matter.

Note that when the corresponding original data file does not exists in the storage area suggested by the original location information, even if the original location information exists in the original page of the scanned confidential document printed matter, the processing flow may be constituted, so that the message indicating non-existence of the original data file in a prescribed box is displayed on the display unit 12, to discard this job.

In step S519, the MFP 1 executes image peripheral search.

In step S521, by using the result of an image peripheral search executed in step S519, the MFP 1 displays a candidate of an original document.

In step S523, the MFP 1 receives the selection of the original document by the user, and based on this selection, executes prescribed job in step S517.

Figure 21:
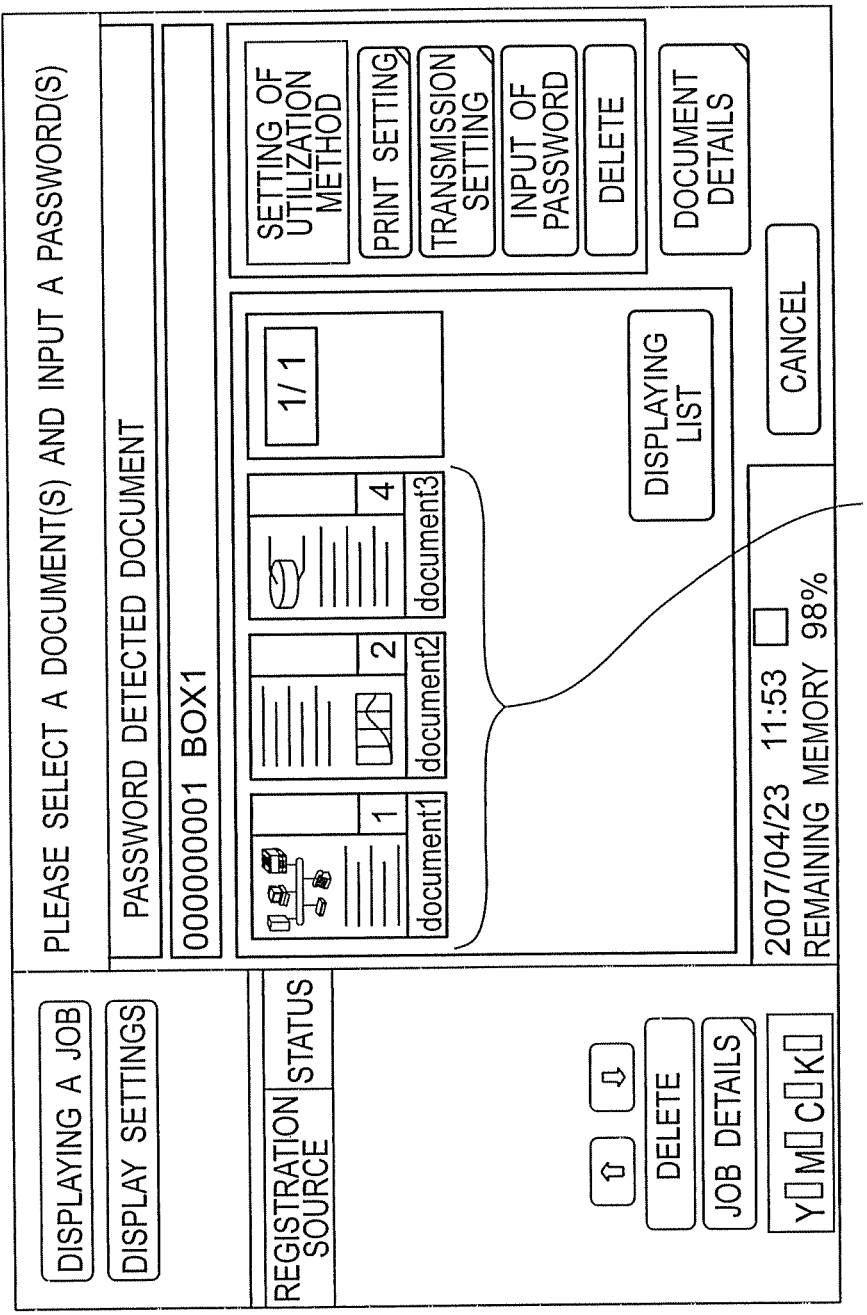
FIG. 21 is an example diagram of the password input screen.

FIG. 21 is a diagram of an example of the password input screen according to this job execution example. In this display example, a thumbnail image 191 of the original page whose password is required to be inputted is preview-displayed. The user can touch the thumbnail image 191, select the original page, and input the password set in this original page.

Thus, in the MFP 1 according to the embodiment of the present invention, the original reading routine 65, the set password acquisition routine 67, and the password input and verifying routines 69 are mutually independently and simultaneously executed. Therefore, if compared with the prior art image forming device, there is an advantage that the duration in which the hardware resource is occupied by this job is shortened by the duration in which the image reading is suspended for waiting for the input of the password in the conventional image forming device. This advantage contributes to improving the usability.

Note that the present invention can also be implemented by constituting the scanner unit, the printer unit, and the controller of the present invention, by using a general-purpose information processing apparatus such as a scanner, a printer, a personal computer which are separately independently disposed, and the mobile terminal, and so forth.

Note that the program realizing the present invention may be stored in the storage device in the image processing apparatus. In addition, the aforementioned program can be circulated in a state of being held in the storage medium such as a flexible disc, an optical disc, a nonvolatile memory including USB memory. Further, the aforementioned program can be distributed via the network.

The present invention has an advantage of shortening the occupancy time of the hardware resource in the image forming device, and an advantage of improving the usability. The present invention is effective in a field of the image forming device.

As this invention may be embodied in several forms without departing from the spirit of essential characteristic thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image forming device that executes a job, being prescribed processing for image data of a document having page divisions, wherein each page division is on a sheet of the document comprised of multiple sheets, with execution of the job limited by a set password set in at least one page division of the document, comprising:

an image data input unit that sequentially receives the image data of the document in each page division;

a set password acquisition unit that acquires set password information, which is information regarding the set password set in the at least one page division of the document, in response to receiving the image data from the image data input unit;

an input password receiving unit that starts reception of input of a password for canceling an execution limit of the job, before the reception of the image data of all page divisions of the document is completed by the image data input unit;

a password verification unit that performs verification between the password received by the input password receiving unit and the set password acquired by the set password acquisition unit;

an execution cancelling unit that cancels the execution limit when the password received by the input password receiving unit is verified by the password verification unit; and a job execution unit that executes the job by using the received image data when the execution limit of the job has been cancelled by the execution cancelling unit, wherein the image data input unit continuously sequentially receives image data of the page divisions of the document even when the input password receiving unit does not receive the password.

2. The image forming device according to claim 1, further comprising:

a scanner unit that generates the image data of an original by photoelectrically reading the original constituting the document;

wherein the scanner unit includes a document feeder on which the original having plural pages can be placed, then sequentially reads each page of the placed original having plural pages, and generates the image data of each page;

the image data input unit sequentially receives the each image data of each page generated by the scanner unit as the image data corresponding to the one page division of the document; and the document is the original having plural pages placed on the document feeder and sequentially scanned by the scanner unit.

3. The image forming device according to claim 2, further comprising a next job execution instruction receiving unit that receives a next job execution instruction for giving instruction of starting the execution of the next job, before the execution of the job is completed, wherein when the next job execution instruction receiving unit receives the next job execution instruction before password verification for the job is completed in the password verification unit, the execution of the next job is started before the execution of the job is completed.

4. The image forming device according to claim 2, wherein the set password information is embedded in the original as at least one of a background pattern and a barcode; and the set password acquisition unit acquires set password information from the at least one of the background pattern and barcode.

5. The image forming device according to claim 2, further comprising:

a sensor that electromagnetically reads data stored in an IC chip, wherein the sensor reads the data stored in the IC chip embedded in the original; and the set password acquisition unit acquires set password information from data stored in the IC chip.

6. The image forming device according to claim 2, further comprising:

at least one of a touch panel and key buttons, wherein the input password receiving unit receives input of the password, via the at least one of the touch panel and the key buttons.

7. The image forming device according to claim 2, further comprising:

a communication interface, wherein the input password receiving unit receives input of the password via an information processing apparatus connected to the communication interface.

8. The image forming device according to claim 2, further comprising:

a data storage unit that stores image data of the document;

a printer unit that prints image data of the document; and a communication interface that transmits the image data of the document, wherein the job whose execution is limited is at least one of: a job for storing the image data of the document into the data storage unit; a job for printing the image data of the document by using the printer unit; and a job for transmitting the image data of the document via the communication interface.

9. The image forming device according to claim 2, further comprising:

a data storage unit that stores image data of a document;

wherein a job whose execution is limited is the job for accessing the image data of the document stored in the data storage unit.

10. The image forming device according to claim 2, wherein when a verification result of the password indicates disagreement of the password, the image data of all pages of the document received by the image data input unit is discarded.

11. The image forming device according to claim 2, wherein when the verification result of the password indicates disagreement of the password, the job execution unit stops execution of the job.

12. The image forming device according to claim 2, further comprising:

a printer unit that prints the image data of the document, wherein, when the job is a job for printing the image data of the document by using the printer unit and a verification result of the password indicates disagreement of the password, the job execution unit makes the printer unit printout at least one of:

blank paper; solid paper; and a repression character, instead of making the printer unit printout the image data of the document.

13. The image forming device according to claim 2, wherein, when the set password acquisition unit acquires a plurality of set password information having same passwords in executing the job, password verification is performed by the password verification unit between the same set passwords and a single password received by the input password receiving unit.

14. The image forming device according to claim 2, further comprising:

a password re-input instruction unit that gives an instruction of re-input of a password required for canceling execution limit of the job, wherein, when the verification result of the password verification unit indicates disagreement of the password, the password re-input instruction unit outputs information for prompting re-input of the password required for canceling the execution limit of the job.

15. The image forming device according to claim 2, further comprising:

a timer unit that measures time elapsed from starting reception of input of the password by an input password receiving unit, wherein when the time measured by the timer unit exceeds prescribed time, the image data of all pages of the document received by the image data input unit is discarded.

16. The image forming device according to claim 2, further comprising a data storage unit that stores at least a part of the image data of all pages of the document received by the image data input unit, wherein, when the job is a job that stores at least a part of the image data of the document into the data storage unit, the job execution unit executes the job, irrespective of match or disagreement of the password indicated by a verification result of the password.

17. An image forming method in an image forming device that executes a job, being prescribed processing for image data of a document having page divisions, wherein each page division is on a sheet of the document comprised of multiple sheets, with execution of the job limited by a set password set in at least one page division of the document, comprising:

sequentially receiving the image data of the document in each page division; acquiring set password information, which is information regarding the set password set in the at least one page division of the document, in response to receiving the image data;

starting reception of input of a password for canceling an execution limit of the job, before the reception of the image data of all page divisions of the document is completed;

performing verification between the password received in the reception of input of the password and the set password acquired in the acquisition of the set password information;

cancelling the execution limit when the password received by the reception of the input of the password is verified; and executing the job by using the received image data when the execution limit of the job has been cancelled, wherein the image data of the page divisions of the document is continuously sequentially received even when the password is not received.

18. A non-transitory computer-readable medium storing a program that makes a computer execute image formation, the computer constituting an image forming device that executes a job, being prescribed processing for image data of a document having page divisions, wherein each page division is on a sheet of the document comprised of multiple sheets, with execution of the job limited by a set password set in at least one page division of the document, the program comprising:

code that sequentially receives the image data of the document in each page division, by using an image data input unit;

code that acquires set password information, which is information regarding the set password set in the at least one page division of the document, in response to receiving the image data from the image data input unit by using a set password acquisition unit;

code that starts reception of input of a password for canceling an execution limit of the job, before the reception of the image data of all page divisions of the document is completed by the image data input unit;

code that performs password verification by using a password verification unit, between the password received by an input password receiving unit and the set password acquired by the set password acquisition unit;

code that cancels the execution limit, by using an execution cancelling unit, when the password received by the reception of the input of the password is verified by the password verification unit; and code that executes the job by using the received image data when the execution limit of the job has been cancelled, wherein, the image data of the page divisions of the document is continuously sequentially received even when the password is not received.

* * * * *